US010748376B2

(12) United States Patent
Zhang et al.

(10) Patent No.: US 10,748,376 B2
(45) Date of Patent: Aug. 18, 2020

(54) REAL-TIME GAME TRACKING WITH A MOBILE DEVICE USING ARTIFICIAL INTELLIGENCE

(71) Applicant: NEX Team Inc., San Jose, CA (US)

(72) Inventors: Qi Zhang, Hong Kong (HK); Keng Fai Lee, Cupertino, CA (US); Wing Hung Chan, Hong Kong (HK)

(73) Assignee: NEX Team Inc., San Jose, CA (US)

( * ) Notice: Subject to any disclaimer, the term of this patent is extended or adjusted under 35 U.S.C. 154(b) by 0 days.

(21) Appl. No.: 16/653,473

(22) Filed: Oct. 15, 2019

(65) Prior Publication Data

US 2020/0043287 A1 Feb. 6, 2020

Related U.S. Application Data

(63) Continuation-in-part of application No. 16/109,923, filed on Aug. 23, 2018, now Pat. No. 10,489,656.
(Continued)

(51) Int. Cl.
*G07F 17/32* (2006.01)
*A63F 13/79* (2014.01)
*A63F 13/812* (2014.01)

(52) U.S. Cl.
CPC ......... *G07F 17/3239* (2013.01); *A63F 13/79* (2014.09); *A63F 13/812* (2014.09); *G07F 17/3211* (2013.01); *G07F 17/3223* (2013.01)

(58) Field of Classification Search
CPC ............. G07F 17/3239; G07F 17/3223; G07F 17/3211; A63F 13/79; A63F 13/812
See application file for complete search history.

(56) References Cited

U.S. PATENT DOCUMENTS 6,307,576 B1 10/2001 Rosenfeld
7,613,324 B2 * 11/2009 Venetianer ......... G06K 9/00771
348/143
(Continued)

OTHER PUBLICATIONS

Hsia, Chih-Hsien, et al. "Analyses of basketball player field goal shooting postures for player motion correction using kinect sensor." 2014 International Symposium on Intelligent Signal Processing and Communication Systems (ISPACS). IEEE, 2014. (Year: 2014).*
(Continued)

*Primary Examiner* — Bobbak Safaipour
(74) *Attorney, Agent, or Firm* — American Patent Agency PC; Daniar Hussain; Xiaomeng Shi

(57) ABSTRACT

Methods and systems are disclosed for real-time tracking of a multiplayer ball game using a mobile computing device. The methods and systems are configured to receive an input video of the multiplayer ball game captured using a camera on the mobile computing device in a gaming area associated with n players, where n is an integer and n≥2; detect a plurality of player postures, by performing a computer vision algorithm on each of a plurality of frames of the input video; extract an associated player feature from each of the plurality of player postures; assign each of the plurality of player postures, based on the associated player feature, to one of at least n posture groups, where each player is represented by one of the at least n posture groups; and determine a player location for each player, based on the player's posture group.

20 Claims, 21 Drawing Sheets

Related U.S. Application Data

(60) Provisional application No. 62/561,461, filed on Sep. 21, 2017, provisional application No. 62/631,865, filed on Feb. 18, 2018, provisional application No. 62/746,152, filed on Oct. 16, 2018.

(56) References Cited

U.S. PATENT DOCUMENTS

| | | | |
|---|---|---|---|
| 8,306,390 B2* | 11/2012 | Yoshikawa | G06T 7/20 386/241 |
| 8,845,460 B1* | 9/2014 | Feldstein | A63B 69/0071 473/433 |
| 9,886,624 B1 | 2/2018 | Marty et al. | |
| 10,010,778 B2 | 7/2018 | Marty et al. | |
| 2003/0053659 A1* | 3/2003 | Pavlidis | G06K 9/00335 382/103 |
| 2005/0143154 A1 | 6/2005 | Bush | |
| 2006/0204045 A1* | 9/2006 | Antonucci | G06K 9/00342 382/107 |
| 2007/0155493 A1* | 7/2007 | Sata | A63F 13/10 463/33 |
| 2008/0312010 A1* | 12/2008 | Marty | A63B 24/0003 473/447 |
| 2009/0060321 A1* | 3/2009 | Gillard | G06K 9/00624 382/154 |
| 2010/0248830 A1* | 9/2010 | Otomo | A63F 13/10 463/31 |
| 2012/0289296 A1* | 11/2012 | Marty | G06K 9/00342 463/3 |
| 2013/0058532 A1* | 3/2013 | White | A63B 24/0003 382/103 |
| 2013/0095960 A9* | 4/2013 | Marty | G06T 7/70 473/447 |
| 2013/0095961 A1* | 4/2013 | Marty | A63B 24/0003 473/450 |
| 2014/0180451 A1* | 6/2014 | Marty | G09B 19/0038 700/91 |
| 2014/0222177 A1* | 8/2014 | Thurman | G09B 19/0038 700/92 |
| 2015/0131845 A1* | 5/2015 | Forouhar | G06K 9/00724 382/100 |
| 2015/0145728 A1* | 5/2015 | Addison | G01S 5/14 342/465 |
| 2016/0279498 A1* | 9/2016 | Gordon | A63B 24/0062 |
| 2016/0339297 A1* | 11/2016 | Hohteri | G06K 9/00624 |
| 2017/0116788 A1* | 4/2017 | Chenglei | H04N 13/351 |
| 2017/0132470 A1* | 5/2017 | Sasaki | G06K 9/00885 |
| 2017/0134644 A1* | 5/2017 | Ueda | G06T 7/20 |
| 2017/0154222 A1* | 6/2017 | Zakaluk | H04N 21/23418 |
| 2018/0032846 A1* | 2/2018 | Yang | G06K 9/00711 |
| 2018/0056124 A1* | 3/2018 | Marty | A63B 71/0622 |
| 2018/0082428 A1* | 3/2018 | Leung | G06T 7/215 |
| 2018/0147468 A1* | 5/2018 | Gordon | G09B 19/0038 |
| 2018/0218243 A1* | 8/2018 | Felsen | G06N 20/00 |
| 2018/0290019 A1* | 10/2018 | Rahimi | A63B 24/0021 |
| 2018/0293736 A1* | 10/2018 | Rahimi | G06T 7/20 |
| 2019/0087661 A1 | 3/2019 | Lee et al. | |
| 2019/0176012 A1* | 6/2019 | Ianni | A63B 71/0605 |
| 2019/0180448 A1* | 6/2019 | Ro | G06T 7/246 |
| 2019/0282905 A1* | 9/2019 | Oshino | A63F 13/57 |
| 2019/0294882 A1* | 9/2019 | Ackland | G06K 9/00724 |
| 2019/0366153 A1* | 12/2019 | Zhang | A63B 24/0062 |

OTHER PUBLICATIONS

Kim, Kihwan, et al. "Motion fields to predict play evolution in dynamic sport scenes." 2010 IEEE Computer Society Conference on Computer Vision and Pattern Recognition. IEEE, 2010. (Year: 2010).*

Krzysztof Przednowek, et al., "A System for Analysing the Basketball Free Throw Trajectory Based on Particle Swarm Optimization," Applied Sciences, 2018, vol. 8, Issue 11, p. 2090, MDPI, Basel, Switzerland.

Simone Francia, "SpaceJam: a Dataset for Basketball Action Recognition," Github Code Repository Page, available at: https://github.com/simonefrancia/SpaceJam, last access: Apr. 2, 2019.

Techsmith Corporation, "Coach's Eye," Coach's Eye website, available at: https://www.coachseye.com/, last accessed: Feb. 18, 2019.

Stats LLC, "Stats SportVU Basketball Player Tracking," SportVU website, available at: https://www.stats.com/sportvu-basketball/, last accessed: Feb. 12, 2019.

Vignesh Ramanathan, et al., "Detecting events and key actors in multi-person videos," The IEEE Conference on Computer Vision and Pattern Recognition (CVPR), 2016, pp. 3043-3053.

Mark Sandler, et al., "MobileNetV2: Inverted Residuals and Linear Bottlenecks," The IEEE Conference on Computer Vision and Pattern Recognition (CVPR), 2018, pp. 4510-4520, available at: https://arxiv.org/abs/1801.04381, last accessed: May 7, 2019.

Wei Liu, et al., "SSD: Single Shot MultiBox Detector," European conference on computer vision, pp. 21-37, Springer, Cham, 2016, available at: https://arxiv.org/abs/1512.02325, last accessed: May 7, 2019.

Zhe Cao, et al., "Realtime Multi-Person 2D Pose Estimation using Part Affinity Fields," Proceedings of the IEEE Conference on Computer Vision and Pattern Recognition, pp. 7291-7299, 2017, available at: https://arxiv.org/abs/1611.08050, last accessed: May 7, 2019.

Andrew G. Howard, et al., "MobileNets: Efficient Convolutional Neural Networks for Mobile Vision Applications," arXiv preprint arXiv:1704.04861, 2017, available at: https://arxiv.org/abs/1704.04861, last accessed: May 7, 2019.

Raine Kajastila, et al., "Motion Games in Real Sports Environments," XXII.2 Mar. + Apr. 2015, Available at: https://interactions.acm.org/archive/view/march-april-2015/motion-games-in-real-sports-environments, last accessed May 21, 2019.

Raine Kajastila, et al., "Empowering the Exercise: a Body-Controlled Trampoline Training Game," International Journal of Computer Science in Sport-Volume 13/2014/Edition 1, Available at: www.iacss.org.

Raine Kajastila, et al., "Augmented Climbing: Interacting With Projected Graphics on a Climbing Wall," CHI 2014, Apr. 26-May 1, 2014, Toronto, ON, Canada, ACM 978-1-4503-2474-8/14/04. Available at: http://dx.doi.org/10.1145/2559206.2581139, last accessed May 22, 2019.

Perttu Hamalainen, Tommi Llmonen, et al., "Martial Arts in Artificial Reality," CHI 2005 Papers: Enhancing Virtual Spaces and Large Displays, Apr. 2-7, Portland Oregon, US.

Rainer Planinc, et al., "Exergame Design Guidelines for Enhancing Elderly's Physical and Social Activities," Ambient 2013 : The Third International Conference on Ambient Computing, Applications, Services and Technologies Available at: https://pdfs.semanticscholar.org/80d7/ddb6d443ef693fd59e12b5413a2a142ef6da.pdf.

Kazumoto Tanaka et al., "A Comparison of Exergaming Interfaces for Use in Rehabilitation Programs and Research," The Journal of the Canadian Game Studies Association, vol. 6(9): 69-81, 2012, Available at: http://loading.gamestudies.ca.

Andy Butler, et al.,"Nike 'House of Mamba' LED Basketball Court by AKQA", Aug. 16, 2014, Available at: https://www.designboom.com/design/nike-house-of-mamba-led-basketball-court-08-16-2014/, last accessed Jun. 18, 2019.

* cited by examiner

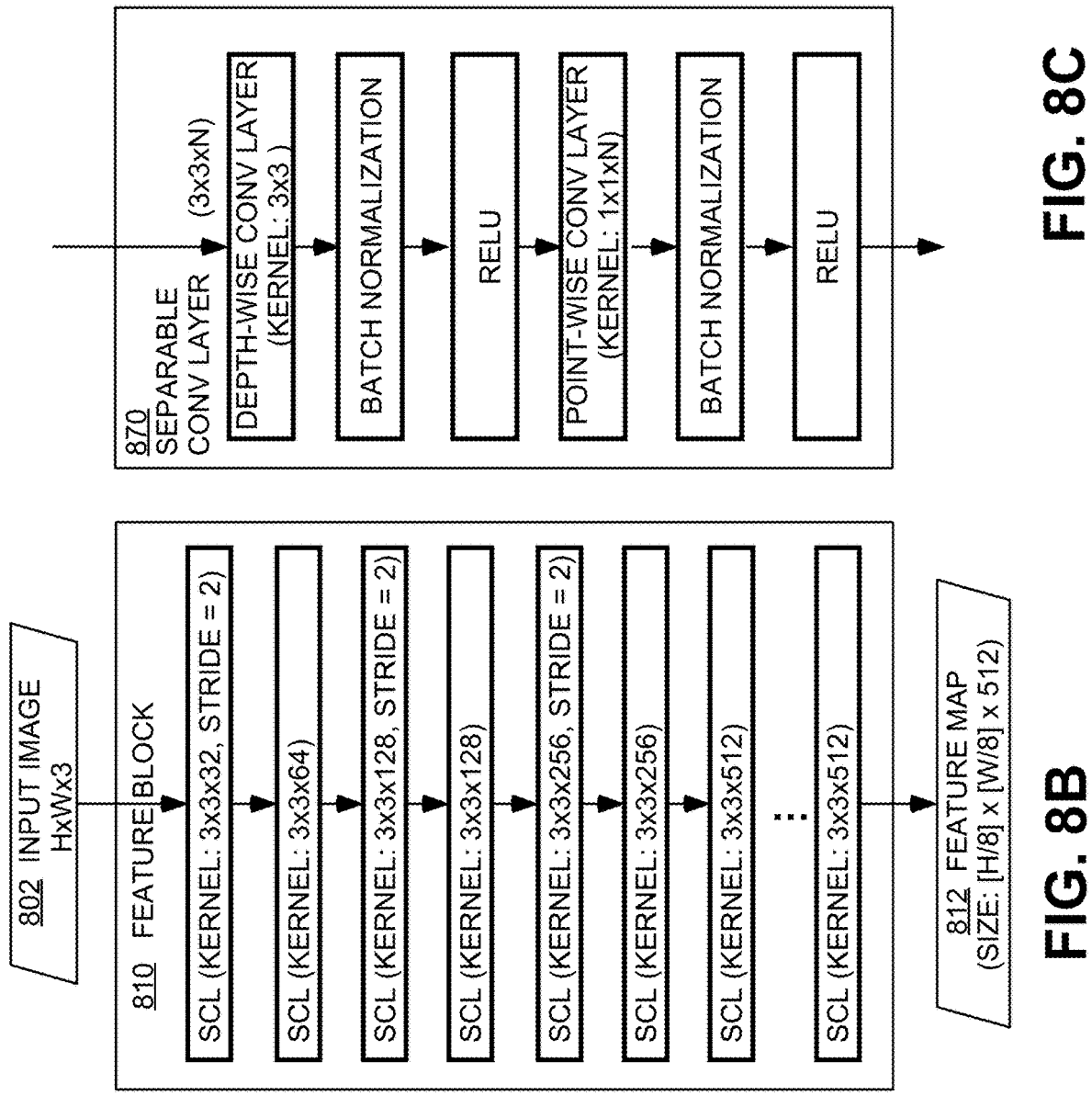

REAL-TIME GAME TRACKING WITH A MOBILE DEVICE USING ARTIFICIAL INTELLIGENCE

REFERENCE TO RELATED APPLICATIONS

This application is a non-provisional of and claims priority to provisional U.S. Ser. No. 62/746,152, filed on Oct. 16, 2018, entitled "Real-Time Game Tracking with a Mobile Device Using Artificial Intelligence", the entire disclosure of which is hereby incorporated by reference in its entirety herein.

This application is also a Continuation-In-Part (CIP) of non-provisional U.S. Ser. No. 16/109,923, filed on 23 Aug. 2018, entitled "Methods and Systems for Ball Game Analytics with a Mobile Device", which itself is a non-provisional of and claims priority to provisional U.S. Ser. No. 62/561,461, filed on 21 Sep. 2017, entitled "Real-Time Analysis of Basketball Shot Attempts with Smartphone Camera," and is a non-provisional of and claims priority to provisional U.S. Ser. No. 62/631,865, filed on 18 Feb. 2018, entitled "Methods and Systems for Real-Time Ball Game Analytics with a Mobile Device," the entire disclosure of all of which are hereby incorporated by reference in their entireties herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of sports and games and pertain particularly to methods and systems for enabling multiplayer game tracking with a mobile device using artificial intelligence, the mobile device having cameras for video capture.

BACKGROUND OF THE INVENTION

The statements in this section may serve as a background to help understand the invention and its application and uses, but may not constitute prior art.

Modern computing technology has brought in a new era of rapid real-time analysis of sports activities. Whether it's a viewer watching a game for leisure, a coach analyzing plays to adapt to the opposing team's strategy, or a general manager compiling data sets across multiple games to optimize player retention strategies, real-time analysis enables thorough quantitative game analysis by granting the viewer instantaneous access to statistical data of every single play. Sport analytics have seen uses in applications such as broadcasting, game strategizing, and team management, yet real-time analytic systems for mass mainstream usage is still complex and expensive. Real-time tracking technology based on image recognition often requires use of multiple high-definition cameras mounted on top of a gaming area or play field for capturing visual data from multiple camera arrays positioned at multiple perspectives, calibration for different environments, and massive processing power in high-end desktop and/or server-grade hardware to analyze the data from the camera arrays. Accurate tracking of key events throughout the game, such as identifying key players involved in point or shot attempts, identifying location of such attempts, and recognizing the results of such attempts, requires vast resources including expensive equipment with complicated setups that prevent mass adaptation of both real-time and off-line sports analytic systems implemented with low-cost, general-purpose hardware having small form factors.

It is against this background that various embodiments of the present invention were developed.

BRIEF SUMMARY OF THE INVENTION

Some embodiments of the present invention include methods, systems, and apparatuses for enabling real-time game tracking with one or more mobile devices.

In particular, a computer implemented method is presented that determine player locations in a multiplayer ball game, comprising the steps of receiving an input video of the multiplayer ball game captured using a camera on a mobile computing device in a gaming area associated with n players, where n is an integer and n≥2; detecting multiple player postures, by performing a computer vision algorithm on each of a first set of frames of the input video; extracting an associated player feature from each of the detected player postures; assigning each of the detected player posture, based on the associated player feature, to one of at least n posture groups, where each player is represented by one of the at least n posture groups; and determining a player location for each player, based on the player's posture group.

In some embodiments, the method further comprises the steps of detecting a ball shot attempt from the first set of frames of the input video, where the ball shot attempt is associated with a shot attempt location from which a shot attempt has been initiated; and determining a shooter for the shot attempt by assigning the ball shot attempt to one of the n players, based on the shot attempt location, and the n player locations.

In some embodiments, each extracted player feature is a color feature quantifying color characteristics of one or more regions of a player image.

In some embodiments, the first set of frames of the input video is non-contiguous.

In some embodiments, the input video is a live video stream.

In some embodiments, the method further comprises an initialization step to detect a presence of then players within a set of boundary lines in the gaming area. In some embodiments, the detecting the presence of the n players within the set of boundary lines is by applying a camera projection to initial foot locations of then players in an image plane of the input video to determine locations of the players in the gaming area, where the initial foot locations are extracted from a second set of frames of the input video.

In some embodiments, the method further comprises a setup step to detect profile player postures by performing the computer vision algorithm on a second set of frames of the input video; extract an associated profile player feature from each of the detected profile player postures; classify each extracted profile player feature into one of n profile player feature clusters representing the n players respectively; and compute n profile player feature centroids for the n profile player feature clusters.

In some embodiments, the classifying of the extracted profile player features comprises applying a k-means clustering algorithm to the extracted profile player features.

In some embodiments, the assigning each detected player posture to one of the at least n posture groups is by bipartite matching to assign each detected player posture to a player having a profile player feature centroid closer to the player feature associated with the player posture.

In some embodiments, the method further comprises determining, for each player, a player foot location in the image plane of the input video, based on the corresponding player posture group, where each player location is a location in the gaming area, and where the determining of each player location is by applying a camera projection to the corresponding player foot location. In some embodiments, the method further comprises receiving a user input indicating that n players are participating in the multiplayer ball game.

In some embodiments, the method further comprises determining whether a first player is occluded by a second player; and in response to determining that the first player is occluded, adjusting the first player location along a camera depth direction associated with the mobile computing device.

In some embodiments, the computer vision algorithm comprises a convolutional neural network (CNN) module.

In some embodiments, the method further comprises generating a player analytic for the shooter based on a result of the shot attempt.

In some embodiments, the ball game is basketball.

In another aspect, one embodiment of the present invention is a system for determining player locations in a multiplayer ball game, comprising at least one processor and a non-transitory physical medium for storing program code accessible by the at least one processor, the program code when executed by the processor causes the processor to: detect multiple player postures, by performing a computer vision algorithm on each of a first set of frames of the input video; extract an associated player feature from each detected player posture; assign each player posture, based on the player feature associated with the player posture, to one of at least n posture groups, where each player is represented by one of the at least n posture groups; and determine a player location for each player, based on the player's posture group.

In another aspect, one embodiment of the present invention is a non-transitory physical medium for determining player locations in a multiplayer ball game, the storage medium comprising program code stored thereon, and the program code when executed by a processor causes the processor to: detect multiple player postures, by performing a computer vision algorithm on each of a set of frames of the input video; extract an associated player feature from each detected player posture; assign each detected player posture, based on the player feature associated with the player posture, to one of at least n posture groups, where each player is represented by one of the at least n posture groups; and determine a player location for each player, based on the player's posture group.

In yet another aspect, one embodiment of the present invention is a mobile device having a camera, a hardware processor, and a non-transitory storage medium, the non-transitory storage medium storing executable instructions, the executable instructions when executed by the hardware processor cause the hardware processor to execute a process for Yet other aspects of the present invention include methods, processes, and algorithms comprising the steps described herein, and also include the processes and modes of operation of the systems and servers described herein. Yet other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 8B is a detailed block diagram illustrating an exemplary Feature Block, according to exemplary embodiments of the present invention.

FIG. 8C is a detailed block diagram illustrating an exemplary separable convolutional neural network layer, according to exemplary embodiments of the present invention.

DETAILED DESCRIPTION OF THE INVENTION

Figure 1A:
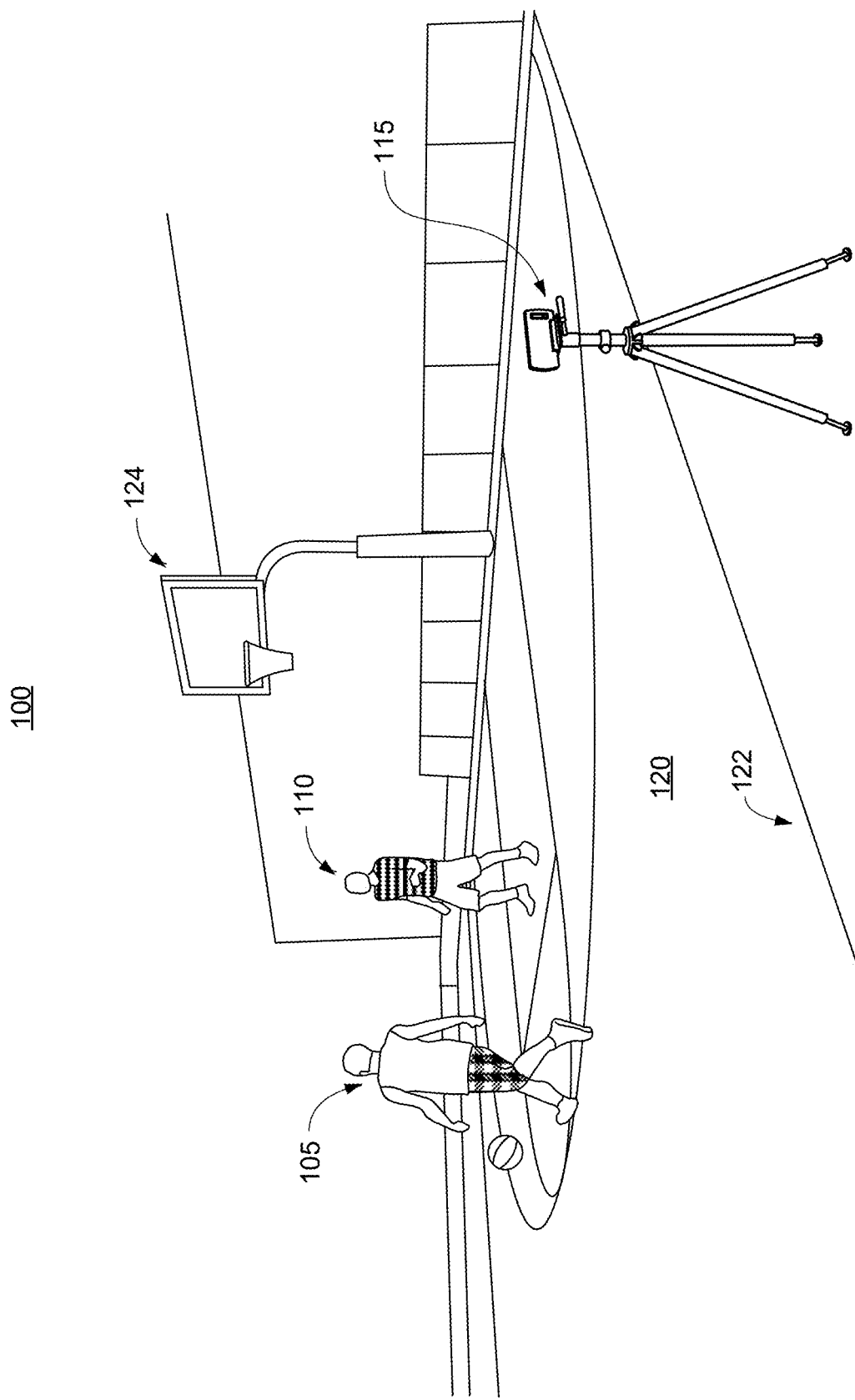
FIG. 1A is an exemplary setup for tracking a multiplayer ball game using a mobile computing device, according to some embodiments of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

NEX, NEX TEAM, and HOMECOURT are trademark names carrying embodiments of the present invention, and hence, the aforementioned trademark names may be interchangeably used in the specification and drawing to refer to the products/services offered by embodiments of the present invention. The term NEX, NEX TEAM, or HOMECOURT may be used in this specification to describe the overall game video capturing and analytics generation platform, as well as the company providing said platform. With reference to the figures, embodiments of the present invention are now described in detail.

Introduction and Overview

Broadly, embodiments of the present invention relate to the tracking of multiplayer sport games and pertain particularly to methods and systems for real-time tracking of a multiplayer ball game using a mobile computing device having one or more on-device cameras, by deploying artificial-intelligence (AI)-based computer vision techniques to render player locations, shot attempt results and various analytics and statistics in real-time.

It would be understood by persons of ordinary skill in the art that the terms "game" and "gameplay" in this disclosure refer to not only competitive activities involving opposing teams, but also individual and group practice or drilling activities. In other words, embodiments of the present invention may be used for analyzing, tracking, scoring of any multiplayer sport activities. In a multiplayer game, at least two active players are present in a gaming area being recorded, while other non-participating or inactive players, coaches, and/or spectators may also be present in a recorded game video. In some embodiments, the gaming area is marked by court lines bounding a goal post. In addition, it is clear to one of ordinary skill in the art that embodiments of the present invention may be applied to soccer, baseball, football, hockey, and many other types of ball sports in a similar fashion.

In particular, embodiments of the present invention relate to recognizing player's poses or postures from an input video of a multiplayer ball game captured by a camera on a mobile computing device, clustering or classifying player postures into individual posture flows based on one or more visual features such as color features of the players' clothes, analyzing posture clusters or flows to determine player locations as the game progresses, and marking foot positions of the players in the input video. That is, embodiments of the present invention track the multiplayer ball game in terms of player movements and locations throughout the game. When the input video is a live video stream, the aforementioned steps are processed continuously as more input video data become available.

More specifically, player clustering is a classification process where detected player images or player postures are assigned to player-specific clusters, where each cluster represents an individual player. If there are n players participating in the multiplayer game, at least n player clusters may be present, while additional "non-player" clusters may be used to represent other non-participating persons such as coaches and spectators. The multiplayer ball game tracking system as disclosed herein first learns visual features of all players in the gaming area for a small period of time, classifies the collected visual features into multiple profile clusters representing individual players, and uses such profile or reference player visual feature knowledge to subsequently track player movement or posture flow in real-time during a gameplay. That is, these profile or reference player visual feature clusters are relied upon to help cluster other player images or postures, and may be continuously updated as more video data become available.

Throughout the gameplay, AI-based algorithms such as machine vision algorithms and the like are deployed, for example to estimate player poses or postures, to extract player visual features, and to analyze posture and/or visual feature data. Each of the aforementioned steps may be performed on a skipped frames basis, where some frames of the input video are skipped over to save computation power. In some embodiments, instance segmentation is applied for the same purpose to detect people, to detect foot location, and to extract players' visual features.

Furthermore, in some embodiments, individual shot attempts are detected as the game progresses, for example by backtracking a trajectory of a ball object from a goal area to when and where the ball was initially released by a shooter. Player locations data as determined above may be compared with shot attempt locations at the time the shot attempt was made to identify one of the players as a shooter making the shot attempt. For each shot attempt, its result and corresponding shooter foot position may be marked on a bird-eye view of the gaming area, and other statistics and analytics relevant to the ball game generated, all by the mobile computing device, such as smartphone or a tablet. Each step of the game analysis processes as disclosed herein may be performed in real-time, and one or more of the steps may be optional. "Game tracking" refers to the process of performing one of more of the aforementioned steps.

A key feature of the present invention is the novel design of mobile-optimized AI-based computer vision techniques that enable efficient real-time computation and analysis on a mobile computing device as a game video is being recorded. Such designs may take advantage of a known number of active players within the gaming area and easily distinguishable color features of the players, to simplify the player tracking and shooter identification process, allowing the rendering of player and game analytics and the player annotation of the game video, in real-time.

Unlike conventional computer vision-based real-time sports analysis systems that require several high-resolution cameras mounted on top of or sidelines of a ball field and the use of high-end desktop or server hardware, embodiments of the present invention allow users to perform real-time tracking and analysis of ball sport games with a single mobile device such as a smartphone, a tablet, a laptop, or smart glasses. In various embodiments, computer vision techniques such as image registration, motion detection, background subtraction, object tracking, 3D reconstruction techniques, cluster analysis techniques, camera calibration techniques such as camera pose estimation and sensor fusion, and modern machine learning techniques such as convolutional neural network (CNN), are selectively combined to perform high accuracy analysis in real-time on a mobile device. The limited computational resources in a mobile device present a very unique challenge. For instance, a smartphone's limited CPU processing power is heat-sensitive. CPU clock rate is reduced by the operating system (OS) whenever the phone heats up. Also, when a system consumes too much memory, it can get killed by the OS. It is also important to be mindful of how much battery the analytics system consumes, otherwise the limited battery on a smartphone may not even last a whole game.

The mobility and flexibility in mounting a mobile computing device enables capturing a ball game from any angle. Embodiments of the present invention can be used in different ball courts or fields, indoor or outdoor, under varying lighting conditions. Embodiments of the present invention may also be able to understand any typical ball court with minimal or no user input, support flexible placement of the mobile device, and be resilient to vibration or accidental movements.

In general, the term analytics refers to meaningful patterns, knowledges, and information from data or statistics. In this disclosure, user or player analytics refer to quantitative and qualitative characterizations of player actions during a gameplay. Exemplary player analytics include but are not limited to, shot types, shot make/miss, shot score, player movement patterns, player moving speed, moving direction, reaction time, jump height and type, jump foot, landing foot, shot release time and angle, and posture statistics such as body bend angle, body rotation, leg bend ratio, and leg power. An analytic may be both a shot analytic specific to a given shot attempt, and a player analytic specific to an identified player. In addition, game analytics generally refer to statistical analytics generated from player analytics and optionally shot analytics over the duration of a game, and team analytics refer to analytics aggregated across players of a team.

Exemplary Embodiment for Multiplayer Ball Game Tracking

Figure 1B:
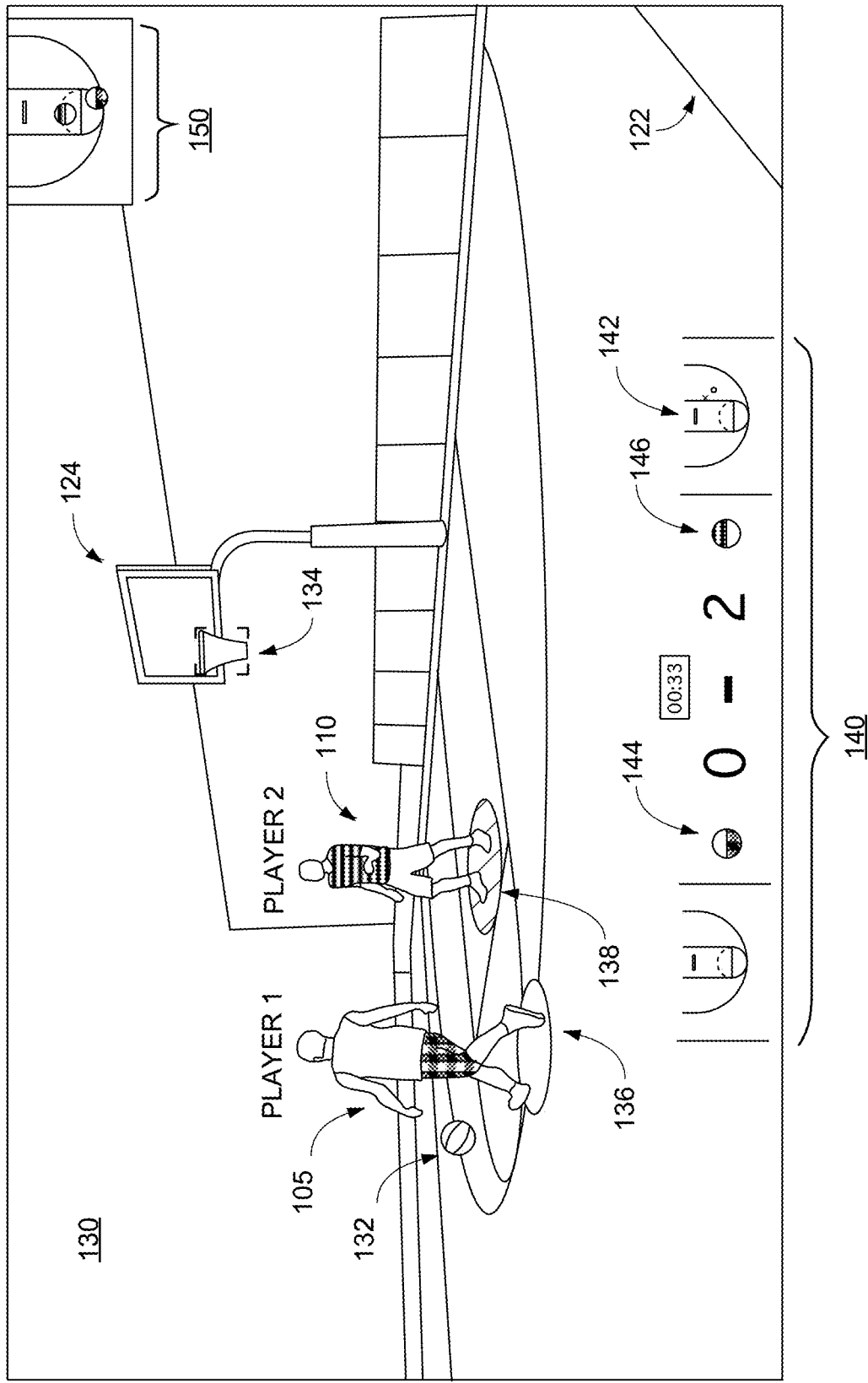
FIG. 1B is a diagram representing an exemplary application running on the mobile computing device in FIG. 1A, according to some embodiments of the present invention.
Figure 1C:
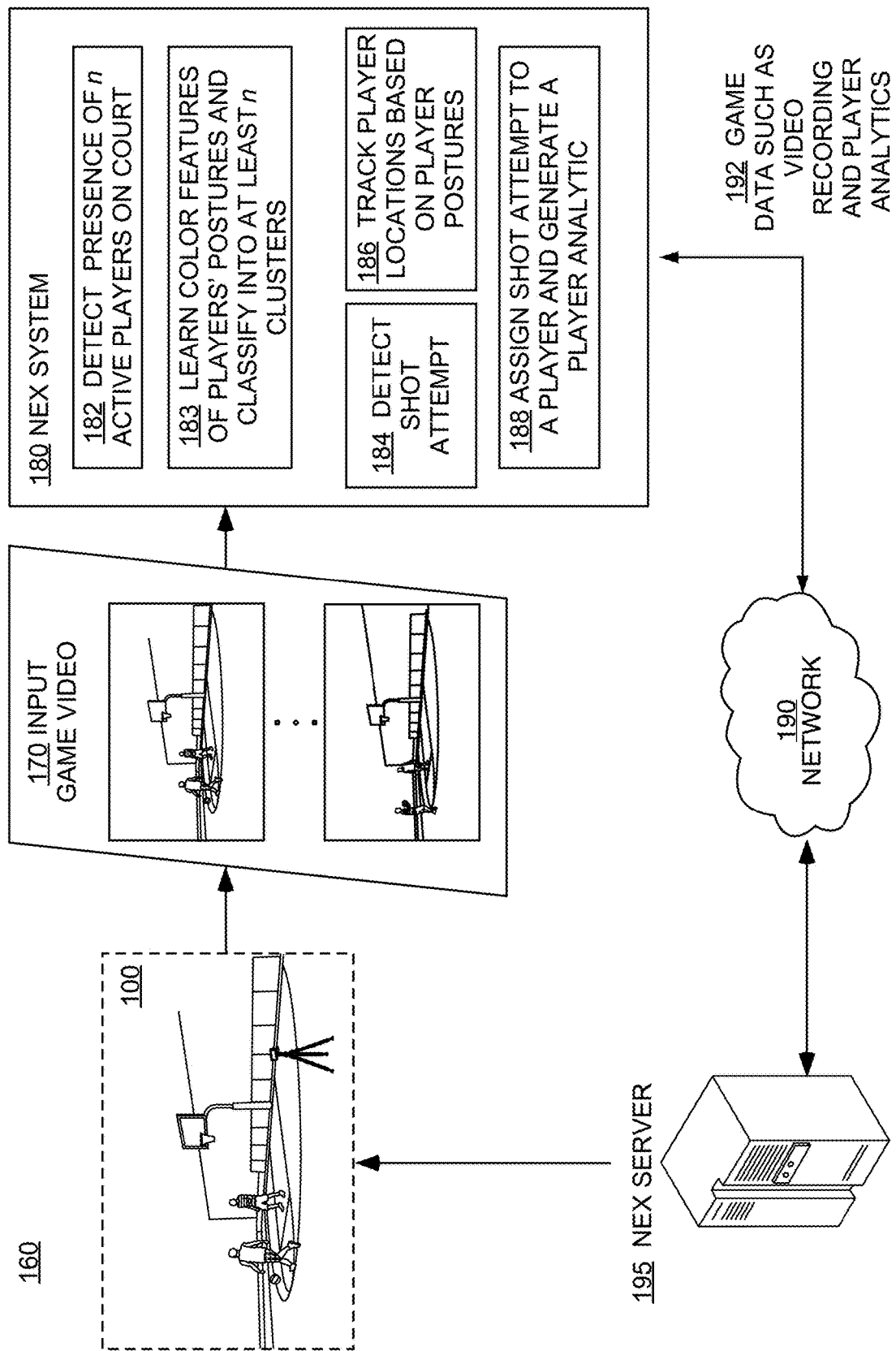
FIG. 1C is an architectural overview of a mobile computing device-based system for multiplayer ball game tracking, according to some embodiments of the present invention.

As an illustrative embodiment, FIGS. 1A to 1C show respective setup and architectural overview of a NEX system for tracking a two-player ball game in real-time, where a first player (Player 1) and a second player (Player 2) play a one-on-one (1-on-1) basketball shooting game. Again, gaming tracking refers to the process of performing one or more steps to detect, extract, recognize, or identify player and ball movements within a gaming area to generate, determine, or provide player, shot, and/or game analytics and statistics.

FIG. 1A is an exemplary setup for tracking a multiplayer ball game in real-time using a mobile computing device, according to some embodiments of the present invention. First player 105 and second player 110 play a 1-on-1 basketball shooting game on a half court 120 bounded by court lines such as 122 and having a goal 124. A mobile computing device 115 is secured on a mounting apparatus and placed within the physical gaming area just outside a side court line. This optional mounting apparatus may be a tripod or a kickstand, and mobile computing device 115 may alternatively be placed on the ground or court floor directly, propped against another object such a water bottle.

During a gameplay or game session, an embodiment of the NEX system implemented on mobile computing device 115 may record a game video using an on-device camera, and perform one or more computer vision algorithms on the game video in real-time, or in near real-time having a small delay on the seconds scale. Such AI-based analysis enables the determination of player locations, and optionally shot attempts, shot attempt results, shot locations, and shooter identities, plus the generation of corresponding game analytics and game video annotations. Mobile computing device 115 may comprise one or more cameras each having one or more lenses for capturing the game video. The captured game video may be presented through a display screen on the mobile computing device, with or without superimposed graphical or textual instructions, player annotations, analytics, statistics, or other game information add-ons. In some embodiments, mobile computing device 115 may be coupled to a larger external display, through a wireless or wired connection, such that the two active players or other users of the NEX system may see the captured game video and game information with better clarity.

In this illustrative example, first player 105 wears a white sleeveless shirt and a pair of basketball shorts having vertical stripes; second player 110 wears a T-shirt with horizontal stripes and white basketball shorts. Without facial features or other body features such as weight, height, or body shape, these color schemes of the players' clothes are sufficient for a human to clearly distinguish the two players. Similarly, a computer vision algorithm may rely on quantitative color visual features to classify or cluster captured images and/or detected postures of the two individual players.

FIG. 1B is a diagram 130 representing an exemplary application running on mobile computing device 115 shown in FIG. 1A, according to some embodiments of the present invention. While a game video is being recorded, the NEX system implemented on mobile device 115 analyzes newly received frames to track player and ball motions within the gaming area. For example, the NEX system may first apply pose-estimation to detect two or more player poses or postures in each frame of the input video, where non-player persons appearing before the camera may also be detected.

Each detected posture may be defined by a set of key points characterizing major parts and joints of the human body, such as head, torso, shoulder, ankle, knee, and wrist. A visual feature of a posture may be computed by sampling pixel colors of specific regions or locations, such as along the torso, hips, thighs, or on interpolated points in-between key points, such as along the limbs. With distinguishable color features, each detected player posture may be classified into one of two clusters representing one of the two players, or a separate "inactive player" cluster representing one or more non-participating persons present in the gaming area. Player posture and identity information thus obtained may be used to annotate players in the input game video with names or tags such as "Player 1" and "Player 2" as the two players move around the ball court or gaming area. In some embodiments, user input may be received before or during a game session on player names, so each player may be labeled accordingly.

For each player postures extracted, a corresponding player foot location within the 2D image plane of the input video frame may be determined by examining the coordinates of key points representing the player's ankles or feet. Such a location may in turn be converted, through a camera projection, into a set of 2D coordinates in the ground plane of the ball court, which in this disclosure is also referred to as a "player location in the gaming area." Exemplary derivations of camera projection matrices are disclosed in parent patent application U.S. Ser. No. 16/109,923, entitled "Methods and Systems Ball Game Analytics with a Mobile Device," the entire disclosure of which is hereby incorporated by reference in its entirety herein. Player foot locations in the image plane and/or player locations within the ball court may be used to annotate the input game video, such as using circular shadows 136 and 138 below the players' feet and on the ground within each video frame.

Furthermore, by locking onto ball 132 and examining its trajectory relative to basket 134, the NEX system may detect shot attempts made by the players. Player location information around the occurrence of the shot attempt may be compared to a shot attempt location, when the shot attempt was initiated or made by a player, to identify the shooter who has made the shot attempt, and subsequently update a score panel 140 and a bird's eye view panel 150.

In this example, score panel 140 shows how much time has lapsed since the beginning of the game (33 seconds), a current score (0-2), and player foot positions at which they have made individual shot attempts. For example, a subdiagram 142 shows that Player 2 has made two shot attempts, one of which was a success, represented by "o," and one of which was a miss, represented by "x." In addition, the two players are represented by their legend icons or symbols respectively, each as circles 144 and 146 in score panel 140, and at their current floor positions in bird's eye view 150. In this embodiment, a legend symbol includes two semicircles, representing color schemes of a player's upper body and lower body respectively. In some embodiments, the legend icons may have other visual or color designs, for example representing a jersey color or a shoe color of each player.

FIG. 1C is an architectural overview of a mobile computing device-based system for multiplayer game tracking, according to some embodiments of the present invention. A NEX system 180 shown in FIG. 1C may be implemented on mobile device such as 115 to capture player actions and ball motions in a gaming area such as a ball court. An input game video 170 thus captured by mobile computing device 115 is analyzed by NEX system 180 using one or more computer vision algorithms, which may also be implemented on mobile computing device 115. Player motion, movement, or posture, ball trajectories, as well as basket and court line positions may be determined. In some embodiments, input game video 170 may by a live video stream captured in real-time.

More specifically, as it is being captured and streamed by NEX system 180, input game video 170 may be analyzed at a step 182 to first initiate a game tracking session, after mobile computing device 115 or input game video 170 has been calibrated or adjusted for device levelness, distance from the player, brightness under a current lighting condition, and other similar environmental parameters. Although not shown explicitly, NEX system 180 may first identify the goal post and the court lines as defining a gaming area of interest, and receive a user input of a total number of n players participating in the game, where n is an integer greater than or equal to two. For example, a user interface may be presented for a player to input a player number such as four players, and for the player to identify which participating players are on the same team. Color features of individual players may also be collected during this time period from input video 170, as part of step 183, to enable NEX system 180 to calculate game analytics for players on the same team. In some embodiments, NEX system 180 may default to a fixed number of players, such as two players as shown in FIGS. 1A and 1B, when a "one-on-one" game option is selected. Subsequently, NEX system 180 may attempt to detect the presence of n active players within boundaries of the ball court, using pose-estimation and camera projection into the ball court, and move onto step 183 when the given number of n players have been detected.

Next, a tracking setup step 183 may be carried out, where pose estimation may again be applied to a selected number of frames of input video 170, for example during a setup period after game video recording starts but before gameplay begins. Pose estimation may occur on a skipped frame bases to reduce computations load.

In computer vision, pose or posture estimation is the task of identifying or detecting the position and orientation of an object in an image, relative to some coordinate system. This is generally formulated as the process of determining key point locations that describe the object. In the case of a ball, pose estimation may refer to determining the center and radius of the ball in the image plane. Human pose estimation is the process of detecting major part and joints of the body, such as head, torso, shoulder, ankle, knee, and wrist. In this disclosure, "player posture" and "player pose" are used interchangeably to refer to either or both of the image of a human player segmented from the input video, and a set of key points extracted from the image to represent body pose or posture. In addition, instead of only determining whether an object such as a ball or a player is present in a given video frame, object detection or extraction in the present disclosure refers to determining the relative position, size, and/or pose of a ball, player, or other entities of interest. In some embodiments, the object detection process is applied on a skip frame basis, for example at regular intervals to downsample the input video stream before processing to reduce computation load, or to possibly bypass desired portions of the input video stream such as when the players at known to be dribbling instead of making shot attempts.

As discussed with reference to FIG. 1B, a visual feature of each detected player posture may be computed by sampling pixel colors of specific regions or locations, such as along the torso, hips, thighs, or on interpolated points in-between posture key points, such as along the limbs. Each player visual feature thus detected form the setup frames may be classified into one of at least n clusters, each representing one of n active players or a separate "inactive player" who is present in the gaming area but not participating in the game. Correspondingly, the player postures from which player color features have been extracted may also be clustered. Any clustering methods may be used here. Examples include but are not limited to k-means, affinity propagation or Density-based spatial clustering of applications with noise (DBSCAN). In some embodiments, the player visual feature clusters as obtained in this setup step may be viewed as profile player feature clusters, and further processed to compute respective feature centroids, against which future visual features may be compared to, based on a distance measure, to assign and cluster such future visual features collected from later portions of input video 170. For example, bipartite matching may be deployed to assign any given player color feature to a profile cluster having a profile player feature centroid closest in distance.

Once setup is completed, input game video 170 may be continuously analyzed via steps 184 and 186 in real-time or near real-time as it is captured. While a shot attempt is being detected in step 184, the same portion of input game vide 170 is analyzed in step 186 to identify player postures and track player locations, as discussed with reference to FIG. 1B. Some exemplary implementations of the shot attempt detection process 184 is disclosed in parent patent application U.S. Ser. No. 16/109,923, entitled "Methods and Systems for Ball Game Analytics with a Mobile Device," the entire disclosure of which is hereby incorporated by reference in its entirety herein.

In one example, the process of detecting a ball shot attempt from input game video 170 may comprises the steps of receiving input video 170 captured using the single mobile device camera 115, where frames of input video 170 comprise a goal 124 having a basket/hoop 134 and a backboard; detecting goal 124, using a Convolutional Neural Network (CNN) module, by detecting one or more key feature points of goal 124 from input video 170, where the CNN module has been trained using one or more prior input videos; identifying a ball tracking Region of Interest (ROI) within the frames of input video 170, where the ROI surrounds the backboard of goal 124 in the frames of input video 170; detecting a ball within the ball tracking ROI over the frames of input video 170; determining a trajectory of ball 132 by backtracking in reverse time over the frames of input video 170; and detecting the ball shot attempt based on the trajectory of ball 132 relative to basket/hoop 134.

In step 188, the shot attempt may be assigned to one of the n players, based on a shot attempt location at which the shot attempt has been initiated or made, and the n player locations in the ball court, as computed from player foot locations in the image plane of input video 170. Such player foot location may be determined from the extracted player postures as the image coordinates of posture key points representing ankles or feet. In addition, one or more player or game analytics may be generated or updated based on a shot attempt result.

In some embodiments, game data 192 from one or more other players or other game sessions including historical sessions by the same players, may be downloaded from a NEX server 195 via a network 190. Game data 192 may include game video recordings, and player and game analytics. While not shown explicitly here, NEX server 195 may comprise one or more databases for storing game videos and analytics, and one or more processors for generating live or historical game statistics for participating users. Exemplary implementations for NEX server 195 are provided with reference to FIG. 3.

As noted, NEX system 180 may distinguish the n players based on visual features such as profile or reference color features obtained during a setup process. In addition to automatically setting up reference color feature clusters as training data for further classification, each player may register with NEX system 180 before the start of the game session by logging in such visual features as well. This registration process may be important when more than two active players are present and/or when players are groups into teams.

To detect objects of interests such as court lines, balls and players from frames of the input video, one or more convolutional neural networks (CNN) may be applied. Each CNN module may be trained using one or more prior input videos. A CNN utilizes the process of convolution to capture the spatial and temporal dependencies in an image, and to extract features from the input video for object detection. The term "feature" here is not limited to visual or color schemes of objects to be detected, it also covers many other object characteristics, including shapes, sizes, curvatures, textures, boundaries, and the like. Feature extraction in turn enables segmentation or identification of image areas representing these objects such as balls and players, and further analysis to determine player body postures. A ball moves through space, leading to changing size and location from video frame to video frame. A player also moves through space while handling the ball, leading to both changing locations, sizes, and body postures.

Figure 2:
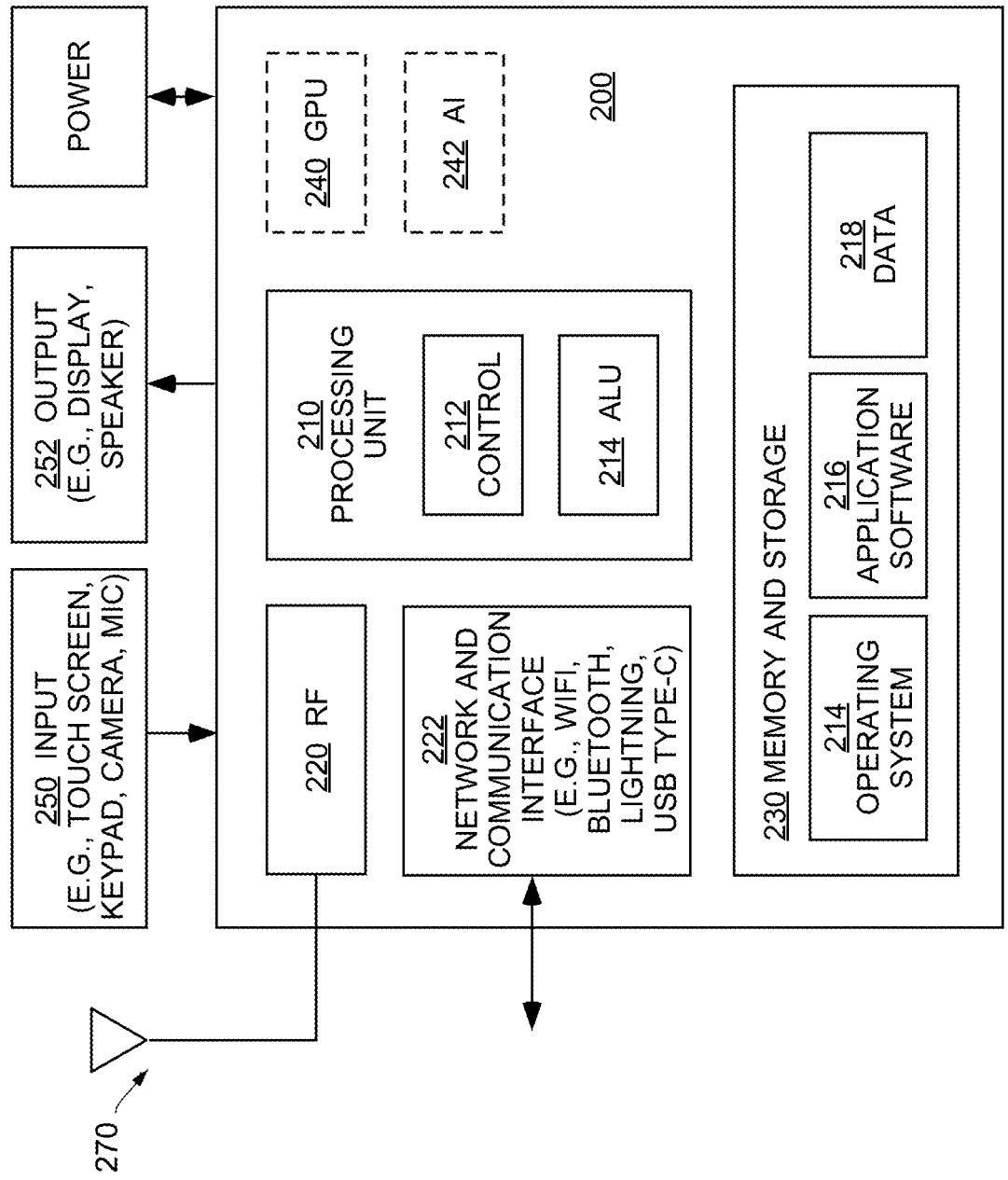
FIG. 2 is an exemplary schematic diagram of a user computing entity for implementing a multiplayer ball game tracking system, according to exemplary embodiments of the present invention.
Figure 3:
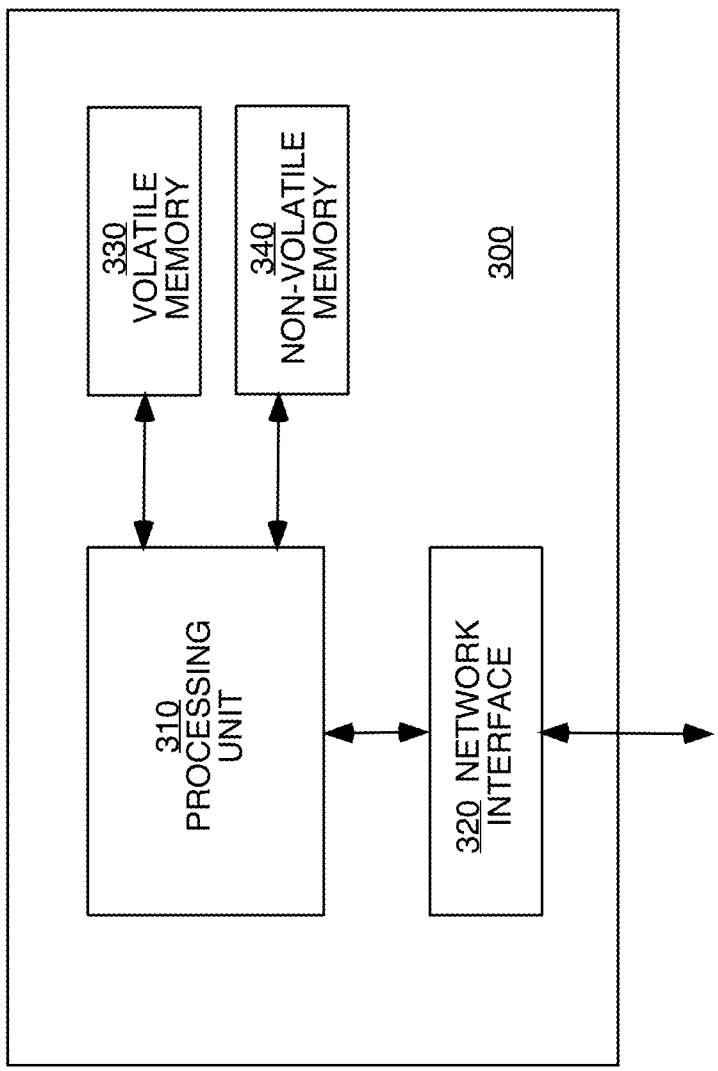
FIG. 3 is an exemplary schematic diagram of a management computing entity for implementing a multiplayer ball game tracking system, according to exemplary embodiments of the present invention.

Once objects are detected or extracted from individual frames and classified into respective clusters, object flows may be established by grouping detected objects within the same cluster along a time line. Object movements across frames are continuous in the sense that object locations can only change in small increments from one video frame to the next. In some embodiments, a flow refers to object instances from different frames. All object instances in the same flow may be considered the same object. In other words, for a ball or posture in a flow, all instances of the ball or posture in all frames of the video are identified as the same object. Thus, in this disclosure, detected player postures may be assigned based on color information to existing player posture flows.
Implementation Using Computer Program Products, Methods, and Computing Entities
Exemplary System Architecture An exemplary embodiment of the present disclosure may include one or more user computing entities 200, one or more networks, and one or more server or management computing entities 300, as shown in FIGS. 2 and 3. Each of these components, entities, devices, systems, and similar words used herein interchangeably may be in direct or indirect communication with, for example, one another over the same or different wired or wireless networks. Additionally, while FIGS. 2 and 3 illustrate the various system entities as separate, standalone entities, the various embodiments are not limited to this particular architecture.
Exemplary User Computing Entity FIG. 2 is an exemplary schematic diagram of a user computing device for implementing a multiplayer ball game tracking system, according to exemplary embodiments of the present invention. A user operates a user computing device 200 that includes one or more components as shown. As will be recognized, these architectures and descriptions are provided for exemplary purposes only and are not limiting to the various embodiments.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, generating for display, monitoring, evaluating, comparing, and/or similar terms used herein interchangeably. In various embodiments, these functions, operations, and/or processes can be performed on data, content, information, and/or similar terms used herein interchangeably. Furthermore, in embodiments of the present invention, user computing device 200 may be a mobile device, and may be operated by a user participating in a multiplayer ball game. On the other hand, a server 195 may be implemented according to the exemplary schematic diagram shown in FIG. 3, possibly in the cloud, and possibly with logically or physically distributed architectures.

As shown in FIG. 2, the user computing entity 200 may include an antenna 270, a radio transceiver 220, and a processing unit 210 that provides signals to and receives signals from the transceiver. The signals provided to and received from the transceiver may include signaling information in accordance with air interface standards of applicable wireless systems. In this regard, the user computing entity 200 may be capable of operating with one or more air interface standards, communication protocols, modulation types, and access types. More particularly, the user computing entity 200 may operate in accordance with any of a number of wireless communication standards and protocols. In some embodiments, user computing entity 200 may operate in accordance with multiple wireless communication standards and protocols, such as 5G, UMTS, FDM, OFDM, TDM, TDMA, E-TDMA, GPRS, extended GPRS, CDMA, CDMA2000, 1xRTT, WCDMA, TD-SCDMA, GSM, LTE, LTE advanced, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or the like. Similarly, the user computing entity 200 may operate in accordance with multiple wired communication standards and protocols, via a network and communication interface 222.

Via these communication standards and protocols, the user computing entity 200 can communicate with various other computing entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). User computing entity 200 can also download changes, add-ons, and updates, for instance, to its firmware, software (e.g., including executable instructions, applications, program modules), and operating system.

In some implementations, processing unit 210 may be embodied in several different ways. For example, processing unit 210 may be embodied as one or more complex programmable logic devices (CPLDs), microprocessors, multi-core processors, coprocessing entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 210 may be configured for a particular use or configured to execute instructions stored in volatile or non-volatile media or otherwise accessible to the processing unit. As such, whether configured by hardware or computer program products, or by a combination thereof, processing unit 210 may be capable of performing steps or operations according to embodiments of the present invention when configured accordingly.

In some embodiments, processing unit 210 may comprise a control unit 212 and a dedicated arithmetic logic unit 214 (ALU) to perform arithmetic and logic operations. In some embodiments, user computing entity 200 may optionally comprise a graphics processing unit 240 (GPU) for specialized image and video rendering tasks, and/or an artificial intelligence (AI) accelerator 242, specialized for applications including artificial neural networks, machine vision, and machine learning. In some embodiments, processing unit 210 may be coupled with GPU 240 and/or AI accelerator 242 to distribute and coordinate processing tasks.

In some embodiments, user computing entity 200 may include a user interface, comprising an input interface 250 and an output interface 252, each coupled to processing unit 210. User input interface 250 may comprise any of a number of devices or interfaces allowing the user computing entity 200 to receive data, such as a keypad (hard or soft), a touch display, a mic for voice/speech, and a camera for motion or posture interfaces. User output interface 252 may comprise any of a number of devices or interfaces allowing user computing entity 200 to provide information to a user, such as through the touch display, or a speaker for audio outputs. In some embodiments, output interface 252 may connect user computing entity 200 to an external loudspeaker or projector, for audio or visual output.

User computing entity 200 may also include volatile and/or non-volatile storage or memory 230, which can be embedded and/or may be removable. A non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store an operating system 214, application software 216, data 218, databases, database instances, database management systems, programs, program modules, scripts, source code, object code, byte code, compiled code, interpreted code, machine code, executable instructions, and/or the like to implement the functions of user computing entity 200. As indicated, this may include a user application that is resident on the entity or accessible through a browser or other user interface for communicating with a management computing entity and/or various other computing entities.

In some embodiments, user computing entity 200 may include location determining aspects, devices, modules, functionalities, and/or similar words used herein interchangeably. For example, user computing entity 200 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites. Alternatively, the location information may be determined by triangulating the user computing entity's position in connection with a variety of other systems, including cellular towers, Wi-Fi access points, and/or the like. Similarly, user computing entity 200 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

In a multiplayer ball game tracking session, a user computing entity 200 may be deployed (e.g., installed; configured; accepted; installed and accepted; configured and accepted; installed, configured, and accepted; or the like) in a gaming area that includes players and/or game equipment. In some embodiments, at least one input device on user computing entity 200 may collect or may be configured to collect information (e.g., data, metadata, and/or signaling) indicative of operational features of the gaming area and/or equipment for analysis by processing unit 210. For example, computer vision algorithms as implemented on user computer entity 200 may be configured to detect the location of court lines, field boundaries, one or more balls, or goal posts in an input video as captured by an input camera device.

In some embodiments, a system for multiplayer ball game tracking may include at least one user computing device such as a mobile computing device and optionally a mounting apparatus for the at least one mobile computing device. The mounting apparatus may be a tripod or a kickstand, and may mount the electronic device with a camera of the user computing device positioned to monitor a gaming area. In some embodiments, the user computing device may be hand-held or put on the ground leaning against certain articles such as a water bottle. In some embodiments, the system for multiplayer ball game tracking further comprises a sound device, for example, earbuds (e.g., wireless earbuds) or a speaker system (e.g., a public address (PA) system) coupled to the at least one user computing device. The sound device may serve to provide instruction and feedback regarding the game session to the user. In some embodiments, the system optionally comprises an optical device such as a projector, a projection lamp, a laser pointing system, a jumbotron, a television screen, or the like, that can facilitate a multiplayer ball game tracking session. For example, a laser pointing system may point to a location in the gaming area to direct the user to position himself or herself for easier system calibration, initialization, and setup.

In some embodiments, user computing entity 200 may communicate to external devices like other smartphones and/or access points to receive information such as software or firmware, or to send information (e.g., training data such as analytics, statistics, scores, recorded video, etc.) from the memory of the user computing device to external systems or devices such as servers, computers, smartphones, and the like.

In some embodiments, two or more users may establish a connection between their computing devices using a network utilizing any of the networking protocols listed previously. At least two of the users may be in geographically different gaming areas. In some embodiments, the user computing devices may use a network interface such as 222 to communicate with various other computing entities, such as by communicating data, content, information, and/or similar terms used herein interchangeably that can be transmitted, received, operated on, processed, displayed, stored, and/or the like.

In some embodiments, data such as training statistics, scores, and videos may be uploaded by one or more user computing devices to a server such as shown in FIG. 3 when the device accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

In some embodiments, audio generated by a user computing device and/or audio generated by one or more users may be used to facilitate a multiplayer ball game tracking session. In some embodiments, audio may be used to (i) direct users to particular positions in gaming areas (with further audio feedback to help the users locate themselves more accurately), (ii) inform users about a motion or action that a user needs to do as part of a setup process or as part of a game (e.g., stand at the center of the free-throw line or shoot from the three-point line), (iii) provide feedback to the user (e.g., to inform them of a shot analytics such as a shot angle), or (iv) report on the progress of the game (e.g., statistics, leaderboard, and the like). In some embodiments, speech recognition and corresponding responses (e.g., audio, visual, textual, etc. responses) may also be used to facilitate the game tracking session by allowing users to set options, or start or stop the tracking session.

In some embodiments, artificial intelligence-based computer vision algorithms may be used to perform at least one of the following: (i) ensure that users are located within a region of interest, (ii) determine when/if users successfully complete a shot attempt, (iii) determine the quality of users' motion/action during the shot attempt, and (iv) award quality points or other attributes depending on the nature of the users' motion during the shot attempt (e.g., determining whether a user scored by dunking or by performing a layup).

To provide for or aid in the numerous determinations (e.g., determine, ascertain, infer, calculate, predict, prognose, estimate, derive, forecast, detect, compute) of training settings, player postures and player analytics described herein, components described herein may examine the entirety or a subset of data to which it is granted access and can provide for reasoning about or determine states of the system or environment from a set of observations as captured via events and/or data. Determinations may be employed to identify a specific context or action, or may generate a probability distribution over states, for example. The determinations may be probabilistic. That is, the computation of a probability distribution over states of interest based on a consideration of data and events. Determinations may also refer to techniques employed for composing higher-level events from a set of events and/or data.

Such determinations may result in the construction of new events or actions from a set of observed events and/or stored event data, whether the events are correlated in close temporal proximity, and whether the events and data come from one or several event and data sources. For example, training instructions and feedbacks to player may be generated from one or more player analytics derived from user training actions. Further, components disclosed herein may employ various classification schemes (e.g., explicitly trained via training data or implicitly trained via observing behavior, preferences, historical information, receiving extrinsic information, etc.) and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems may be used to automatically learn and perform a number of functions, actions, and/or determinations.

Exemplary Management Computing Entity

FIG. 3 is an exemplary schematic diagram of a management computing entity 300, such as NEX server 195, for implementing a multiplayer ball game tracking system, according to exemplary embodiments of the present invention. The terms computing entity, computer, entity, device, system, and/or similar words used herein interchangeably are explained in detailed with reference to user computing entity 200.

As indicated, in one embodiment, management computing entity 300 may include one or more network or communications interface 320 for communicating with various computing entities, such as by communicating data, content, information, and/or similar terms used herein interchangeably that can be transmitted, received, operated on, processed, displayed, stored, and/or the like. For instance, management computing entity 300 may communicate with user computing device 200 and/or a variety of other computing entities. Network or communications interface 320 may utilized a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 300 may be configured to communicate via wireless external communication networks using any of a variety of standards and protocols as discussed with reference to user computing device 200.

As shown in FIG. 3, in one embodiment, management computing entity 300 may include or be in communication with one or more processing unit 310 (also referred to as processors, processing circuitry, processing element, and/or similar terms used herein interchangeably) that communicate with other elements within the management computing entity 300. As will be understood, processing unit 310 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 310 may be configured for a particular use or configured to execute instructions stored in volatile or non-volatile media 330 and 340. As such, whether configured by hardware or computer program products, or by a combination thereof, processing unit 310 may be capable of performing steps or operations according to embodiments of the present disclosure when configured accordingly.

Although not shown explicitly, management computing entity 300 may include or be in communication with one or more input elements, such as a keyboard, a mouse, a touch screen/display, a camera for motion and movement input, a mic for audio input, a joystick, and/or the like. Management computing entity 300 may also include or be in communication with one or more output elements such as speaker, screen/display, and/or the like.

In various embodiments, one or more of the components of management computing entity 300 may be located remotely from other management computing entity components, such as in a distributed system or in the cloud. Furthermore, one or more of the components may be combined and additional components performing functions described herein may be included in the management computing entity 300.

Machine Vision and Machine Learning Modules

As described herein, embodiments of the present invention use one or more artificial intelligence, machine vision, and machine learning algorithms or modules for analyzing game videos and facilitating real-time game tracking. Various exemplary machine vision algorithms are within the scope of the present invention used for performing object recognition, gesture recognition, pose estimation, and so forth. The following description describes in detail some illustrative machine vision and machine learning algorithms for implementing some embodiments of the present invention.

Illustrative Machine Vision Architectures

Some exemplary machine vision algorithms utilize a deep learning network (DLN), for example a convolutional neural network (CNN). Neural networks are computer systems inspired by the human brain. They can be viewed as parallel, densely interconnected computational models that adaptively learn through automatic adjustment of system parameters based on training data. Input information are modified based on system parameters when traversing through layers of interconnected neurons or nodes, to activate or trigger particular outputs. The design of a neural network refers to the configuration of its architecture or topology, or the specific arrangements of layers and nodes in the network. The applicability, utility, and optimality of a neural network, and the framework in which the neural network is deployed are often mutually interdependent. Convolutional Neural Networks utilize the process of convolution to reduce the number of model parameters involved, while successfully capturing the spatial and temporal dependencies in an image.

Figure 4:
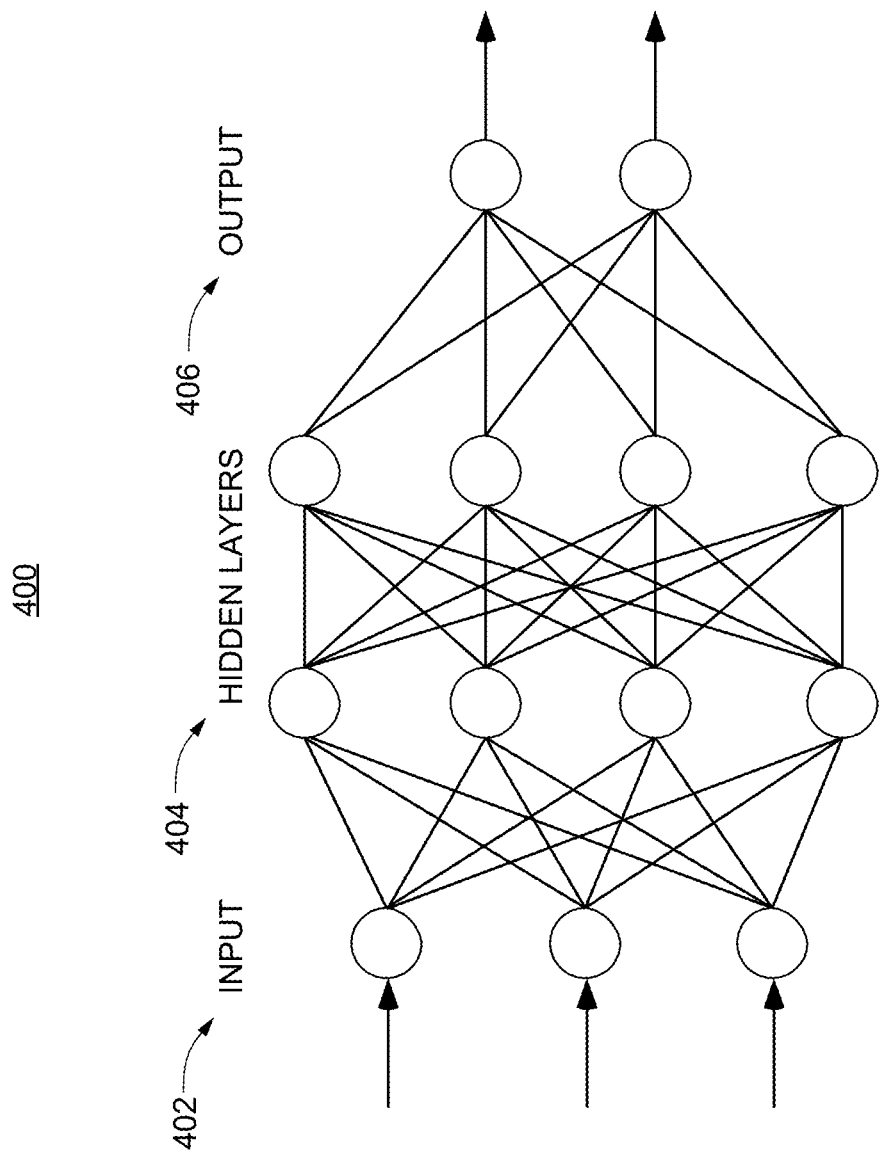
FIG. 4 shows an illustrative block diagram of a convolutional neural network (CNN) for image analysis, according to exemplary embodiments of the present invention.

More specifically, FIG. 4 shows an illustrative block diagram 400 of a convolutional neural network (CNN) for image analysis and object recognition, according to exemplary embodiments of the present invention. This exemplary CNN module 400 may be utilized for implementing various machine vision algorithms described herein. For example, it may be designed and trained to determine gestures and poses and other machine vision tasks required by the present invention, as would be recognized by one of ordinary skill in the art. An input layer 402 is connected via a multiplicity of hidden layers 404 to an output layer 406. Input layer 402 is a map for pixels of an input image. Exemplary hidden layers may include, but are not limited to, convolutional layers, Rectified Linear Units (ReLU), pooling layers, normalization layers, and fully connected layers. A convolutional layer applies a convolution or correlation operation by a kernel matrix to the input data to generate a feature map of the input image. ReLU is a non-linear activation function. Pooling layers reduce the dimensionality of the data to decrease the required computational power. A fully connected layer has full connections to all activations in the previous layer, and is needed before classification or output activation at output layer 406. Successive convolution-ReLU-pooling stages allow the successive extraction of low-level to high-level features, from edges, general shapes such as line and circles, to specific shapes representing specific objects. FIG. 8A to 8E provide exemplary block diagrams of a detailed neural network design for pose estimation.

FIG. 4 shows only one illustrative CNN architecture that is within the scope of the present invention, but the present invention is not limited to the use of CNNs. Other machine vision algorithms are also within the scope of the present invention.

Illustrative Machine Learning Architectures

Figure 5:
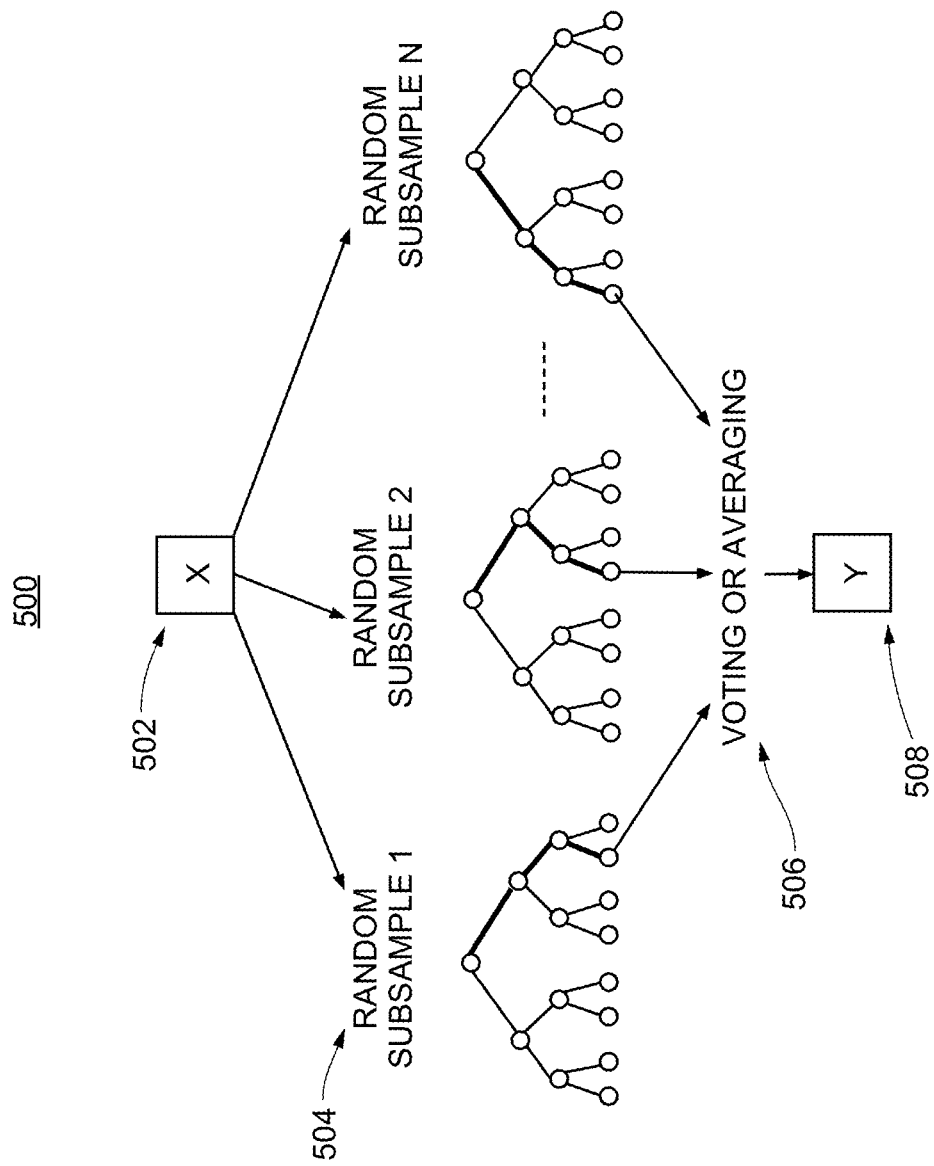
FIG. 5 shows an illustrative block diagram for a machine learning algorithm, according to exemplary embodiments of the present invention.

As states herein, various exemplary machine vision and machine learning algorithms are within the scope of the present invention for performing object recognition, gesture recognition, pose estimation, and so forth. FIG. 5 shows an illustrative block diagram 500 for a machine learning algorithm, according to exemplary embodiments of the present invention.

In particular, a supervised machine learning algorithm is shown, comprising an illustrative random forest algorithm. Random forest algorithms are a method for classification and regression. By using a multitude of decision tree predictors 504, each depending on the values of a random subset of a training data set 502, the chances of overfitting to the training data set may be minimized. The decision tree predictors are voted or averaged at a decision step 506 to obtain predictions 508 of the random forest algorithm. For the task of object recognition, input 502 to the machine learning algorithm may include feature values, while output 508 may include predicted gestures and/or poses associated with a user. Random forest is only one illustrative machine learning algorithm that is within the scope of the present invention, and the present invention is not limited to the use of random forest. Other machine learning algorithms, including but not limited to, nearest neighbor, decision trees, support vector machines (SVM), Adaboost, Bayesian networks, various neural networks including deep learning networks, evolutionary algorithms, and so forth, are within the scope of the present invention.

In short, embodiments of devices, systems, and their various components described herein may employ artificial intelligence (AI) to facilitate automating one or more functions described herein, including object recognition, gesture recognition, and pose estimation.

Training Machine Learning Algorithms

Figure 6:
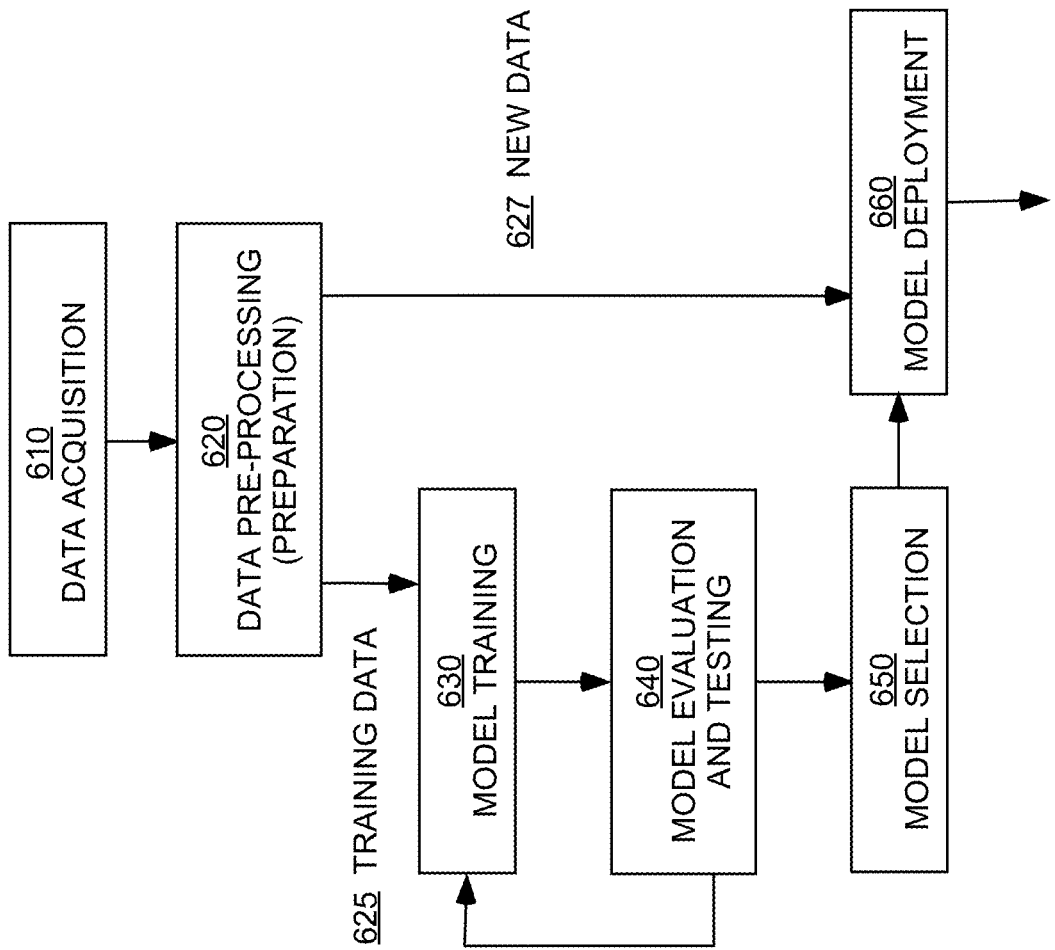
FIG. 6 shows an illustrative flow diagram for training a machine learning algorithm, according to exemplary embodiments of the present invention.

FIG. 6 shows an exemplary flow diagram 600 for training a machine learning (ML) algorithm, which may be utilized in object recognition, pose estimation, and object flow construction, according to exemplary embodiments of the present invention;

The training process begins at step 610 with data acquisition. At step 620, acquired data are pre-processed, or prepared. At step 630, a machine learning model is trained using training data 625. At step 640, the model is evaluated and tested, and further refinements to the model are fed back into step 630. At step 650, optimal model parameters are selected, for deployment at step 660. New data 627 may be used by the deployed model to make predictions.

A starting point for any machine learning method such as used by the machine learning component above is a documented dataset containing multiple instances of system inputs and correct outcomes (e.g., training data 625). This data set may be used, using methods known in the art, including but not limited to standardized machine learning methods such as parametric classification methods, non-parametric methods, decision tree learning, neural networks, methods combining both inductive and analytic learning, and modeling approaches such as regression models, to train the machine learning system and to evaluate and optimize the performance of the trained system. Thus, it would be understood by peoples of ordinary skill in the art that "training data" 625 as referred to in this subsection are directed to data for training a machine vision algorithm or a machine learning algorithm.

The quality of the output of the machine learning system output depends on (a) pattern parameterization, (b) learning machine design, and (c) quality of the training database. These components may be refined and optimized using various methods. For example, the database may be refined by adding datasets for new documented gestures and poses. The quality of the database may be improved, for example, by populating the database with cases in which the gestures and/or poses were correctly recognized. In one embodiment, the database includes data, for example, of mistaken identification of gestures and/or poses, which may assist in the evaluation of a trained system.

Figure 7:
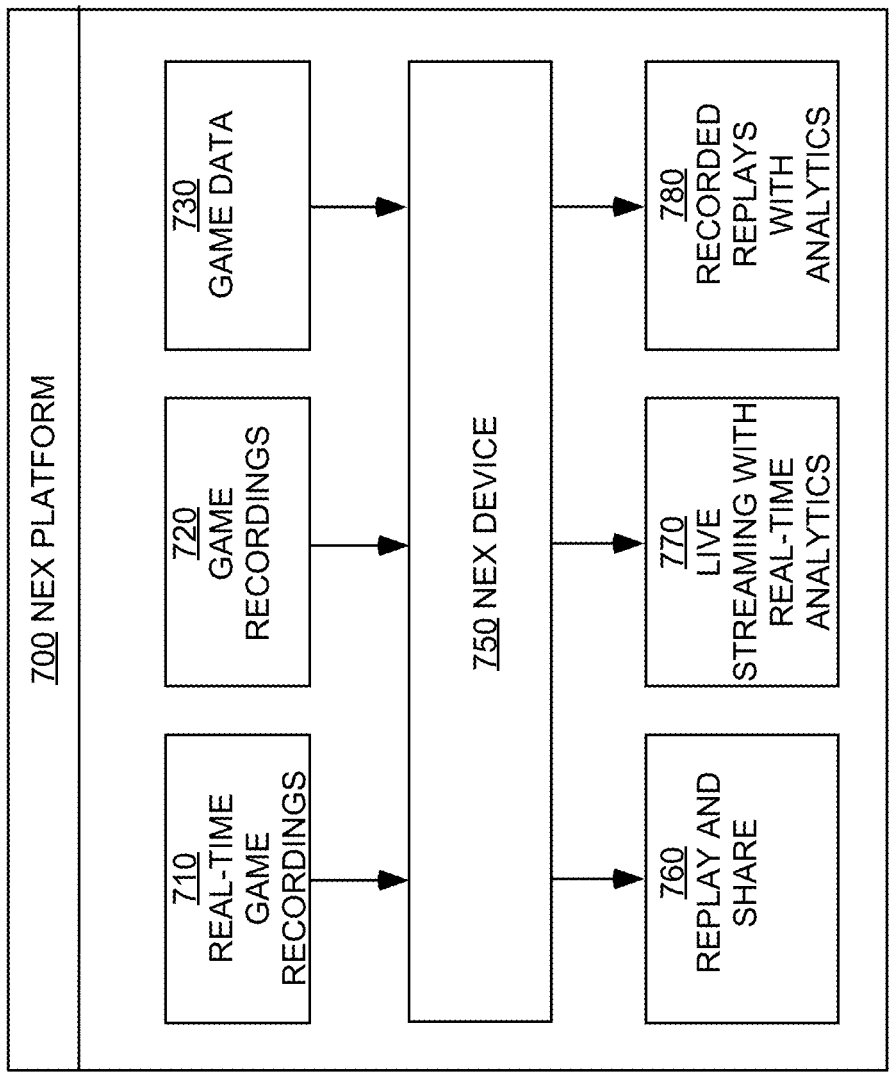
FIG. 7 is a schematic diagram illustrating an exemplary NEX platform, according to exemplary embodiments of the present invention.

FIG. 7 is a schematic diagram illustrating and summarizing some functionalities provided by an extended NEX platform 700, according to some exemplary embodiment of the present invention. In particular, a NEX device 750 may take in real-time streaming game recordings 710, on-demand streaming game recordings 720, game data 730, and facilitate game tracking to generate player analytics, then provide live streaming 770 with real-time analytics, recorded replays 780 with analytics, and any other replay and share functionalities 760.

Although NEX device 750 as shown in FIG. 7 serves as the core for a NEX platform 700, in some embodiments, NEX platform 700 may be networked among multiple user devices, where a NEX server implemented according to the embodiment shown in FIG. 3 may be connected to multiple camera-enabled user computing devices implemented according to the embodiment shown in FIG. 2, and each used to capture game data, and for providing game analytics. Such game video and/or analytics data may be uploaded to the NEX server, which in term may store and facilitate sharing of such data among individual players/users and teams.

Exemplary Convolutional Neural Networks (CNNs) for Pose Estimation

Figure 8A:
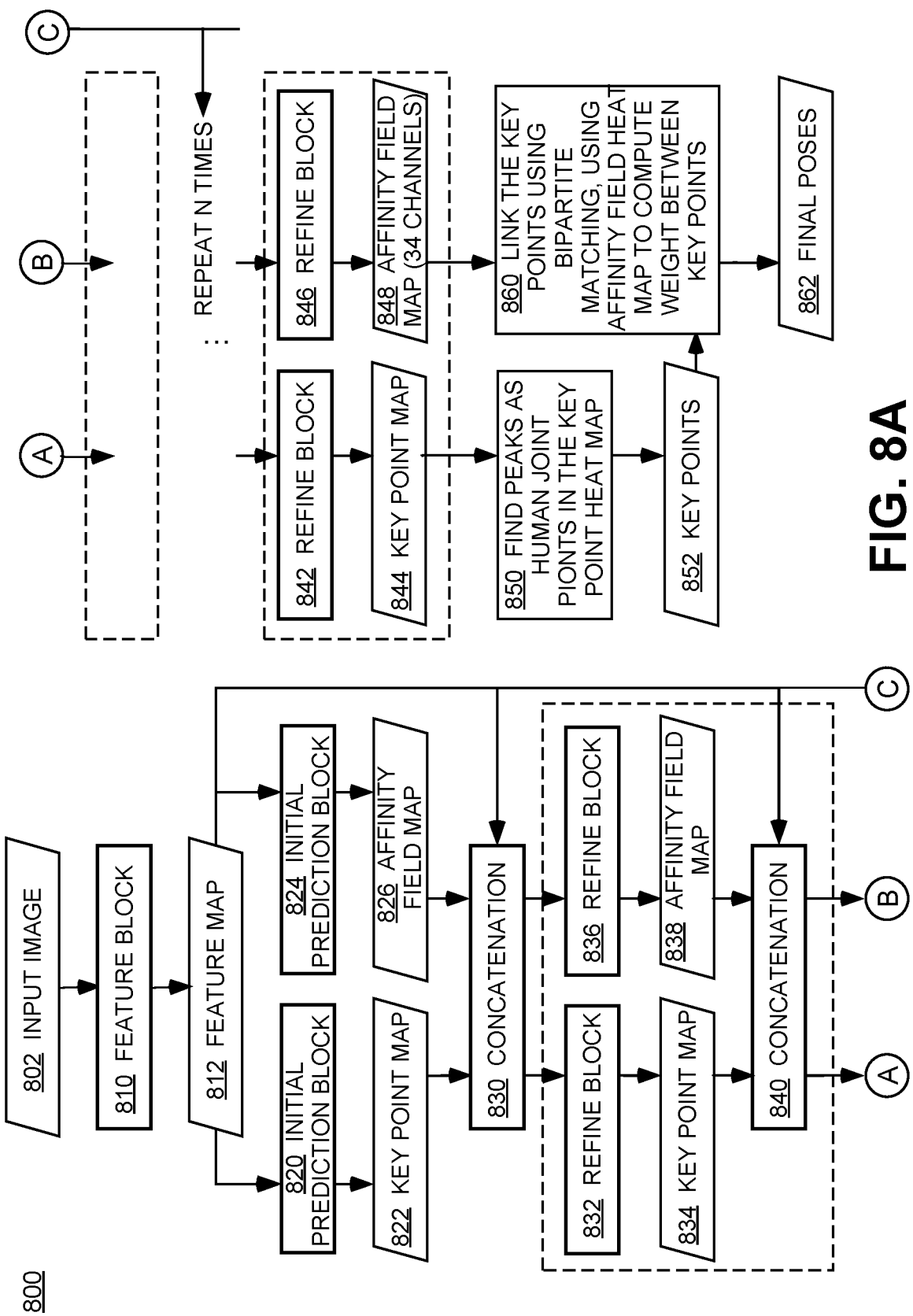
FIG. 8A is a block diagram of an exemplary neural network for pose estimation, according to exemplary embodiments of the present invention.

FIG. 8A is a block diagram 800 of an exemplary neural network for pose estimation, according to some embodiments of the present invention. Here neural network layers or blocks are drawn with thickened lines. In this illustrative example, a two-branch CNN efficiently detects poses of multiple people in an input image by predicting part confidence maps for body parts, and part affinity fields for body part-to-body part association, effectively decoupling the detection of a body part such as an arm or leg, and the assignment of the detected body part to an individual person. A part affinity field (PAF) is a 2D vector field that encodes the location and orientation of body parts including limbs over the image domain. A PAF encodes the association between body parts, where body parts belonging to the same person are linked.

The illustrative network shown in FIG. 8A performs the following steps to estimate the pose of one or more persons in an input image:
1. Use a convolutional network block as a feature extractor to compute a feature map from an input image;
2. Turn the feature map into a key point heat map and an affinity field heat map using another convolutional network block;
3. Refine the key point heat map and the affinity field heat map using yet another convolutional network block, and repeat for several times;
4. Use Rectified Linear Units (ReLU), separable convolutional layers and/or batch normalization techniques to improve the accuracy and performance of the network;
5. Compute final poses by linking the key points using the affinity field heat map.

More specifically, an input image 802 is first passed through a feature block 810 to generate a feature map 812. Initial prediction blocks 820 and 824 then extract a key point map 822 and an affinity field map 826, respectively. A concatenation operation 830 is performed before further refinements are carried out in multiple iterations. For each stage of iteration, refine blocks such as 832, 836, 842, and 846 predict refined key point maps such as 834 and 844, and refined affinity field maps such as 838 and 848, respectively. Concatenation operations such as 840 are performed to generate input for the next stage. A total of N refinements may be carried out, where N may be any positive integer. For example, N may equal to 5 in some embodiments of the present invention. After the last refinement stage, key point heat map 844 is examined in step 850 to find peaks as human joint points or key points 852. Such key points may be linked in step 860 to generate final poses 862, by performing bipartite matching using affinity field heat map 848 to compute weights between key points. In this illustrative example, key point map 844 may comprise 18 channels, while affinity field map 848 may comprise 34 channels.

FIG. 8B is a detailed block diagram illustrating an exemplary Feature Block 810, according to some embodiments of the present invention. In this example, separable convolutional layers (SCL) are deployed with different kernel and stride sizes.

Correspondingly, FIG. 8C is a detailed block diagram illustrating an exemplary separable convolutional neural network layer 870, according to some embodiments of the present invention. A depth-wise separable convolution or a separable convolution layer factorizes a conventional, full convolution operation into a first depth-wise convolution to filter the input channels, and a second point-wise convolution to combine outputs of the depth-wise network layer to build a feature map. Depth-wise separable convolutions trade significant improvements in computational efficiency for a small reduction in accuracy. Batch optimization and ReLU blocks further help improve the accuracy and performance of the network layer. Furthermore, in some embodiments, inverted residuals may be utilized to connect linear bottleneck layers between individual depth-wise separable convolutional layers, which also tradeoff computation and accuracy. Linear bottleneck layers reduce the dimensionality of the input, while inverted residuals use shortcut connections between the bottlenecks to enable faster training and better accuracy.

Figures 8D, 8E:
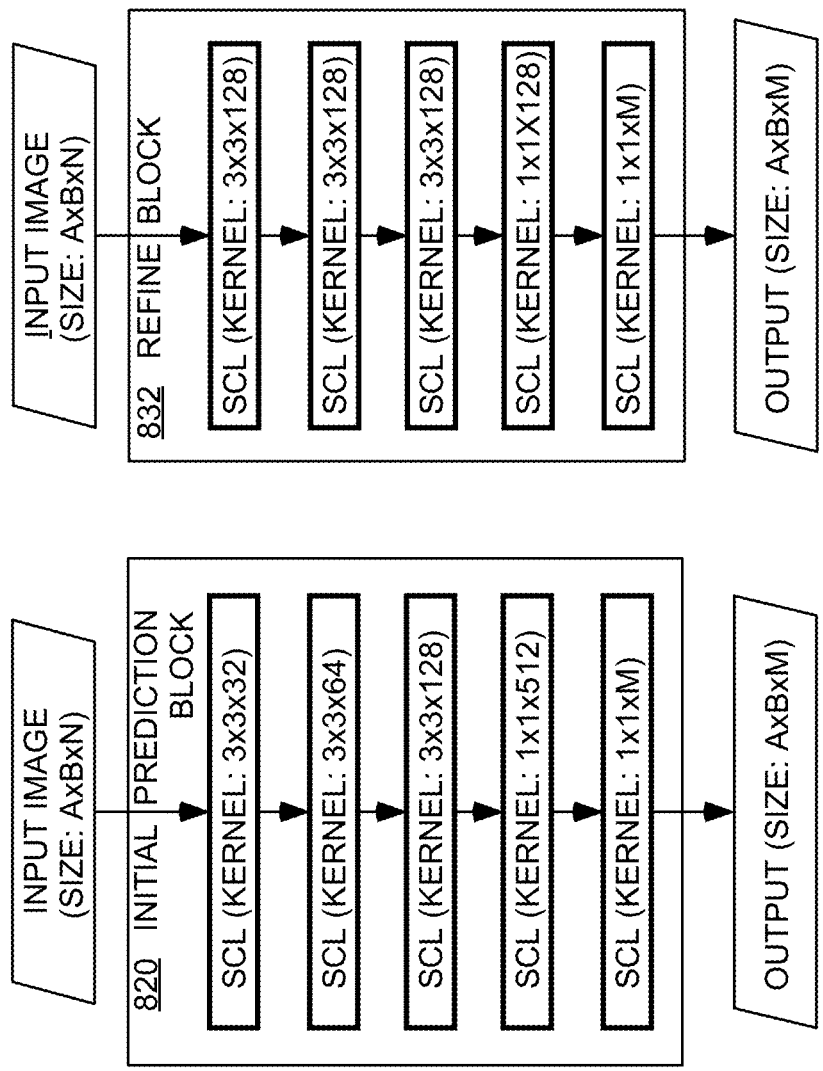
FIG. 8D is a detailed block diagram illustrating an exemplary Initial Prediction Block, according to exemplary embodiments of the present invention.
FIG. 8E is a detailed block diagram illustrating an exemplary Refine Block, according to exemplary embodiments of the present invention.

FIG. 8D is a detailed block diagram illustrating an exemplary Initial Prediction Block 820, according to some embodiments of the present invention; FIG. 8E is a detailed block diagram illustrating an exemplary Refine Block 832, according to some embodiments of the present invention. Both comprise multiple separable convolutional layers having different kernel sizes. The input, output, and kernel sizes shown in FIGS. 8A and 8E are for illustrative purposes only, and other similar hyperparameter values may be used in various embodiments of the present invention.

In some implementations of the present invention, one or more of existing software modules may be utilized, including but not limited to, CoreML for CNN object and key point detection, SceneKit for rendering an AR court, and Core-Motion for understanding a mobile device's orientation.

Exemplary Convolutional Neural Networks (CNNs) for Object Detection

A multiplayer ball game requires a ball and optionally other additional equipment such as a hoop, a backboard, court lines, and the like. The detection of moving and/or static non-human objects from the game video is needed to determine player actions and player analytics.

Figure 9A:
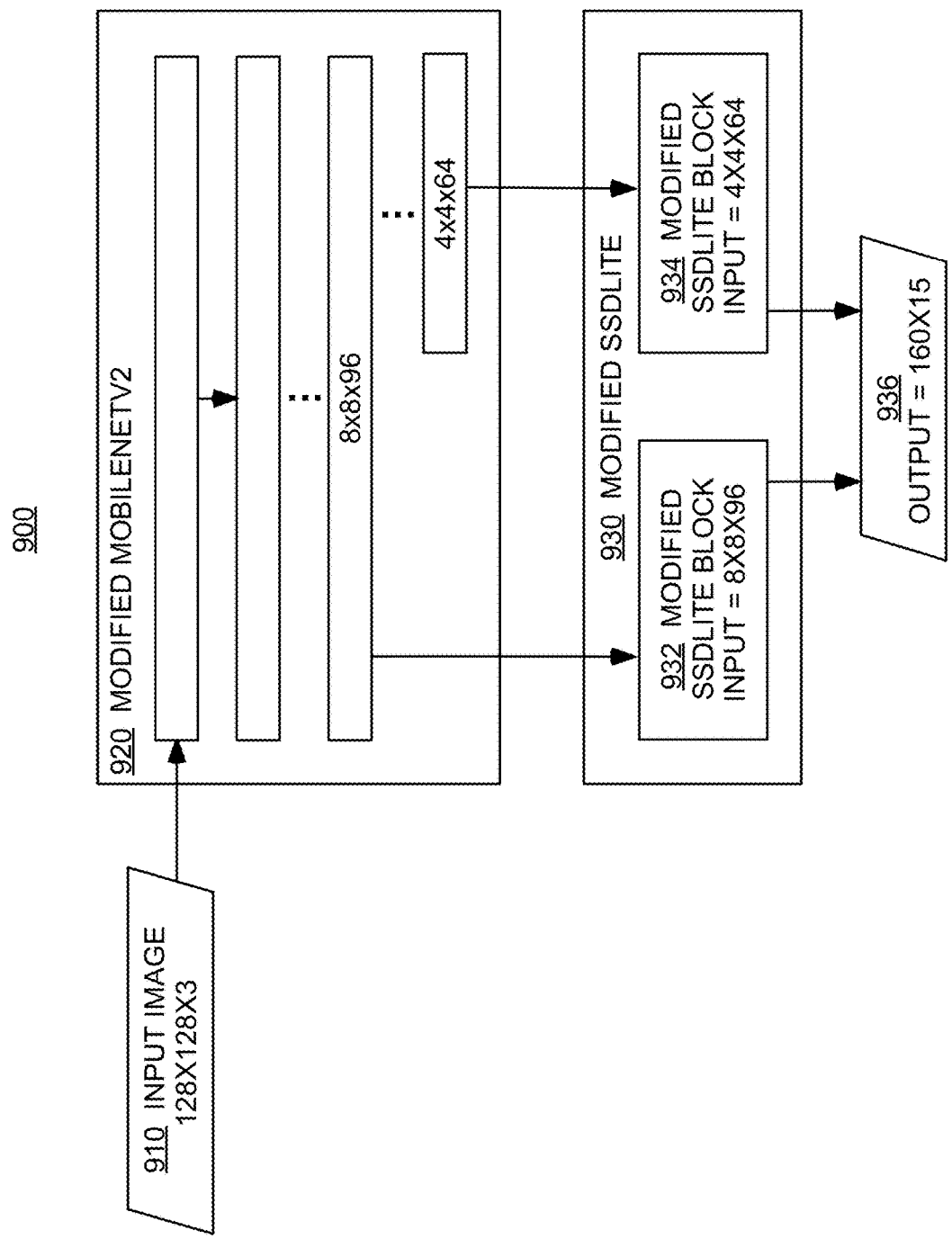
FIG. 9A is a block diagram of an exemplary neural network for ball detection, according to one embodiment of the present invention.
Figure 9B:
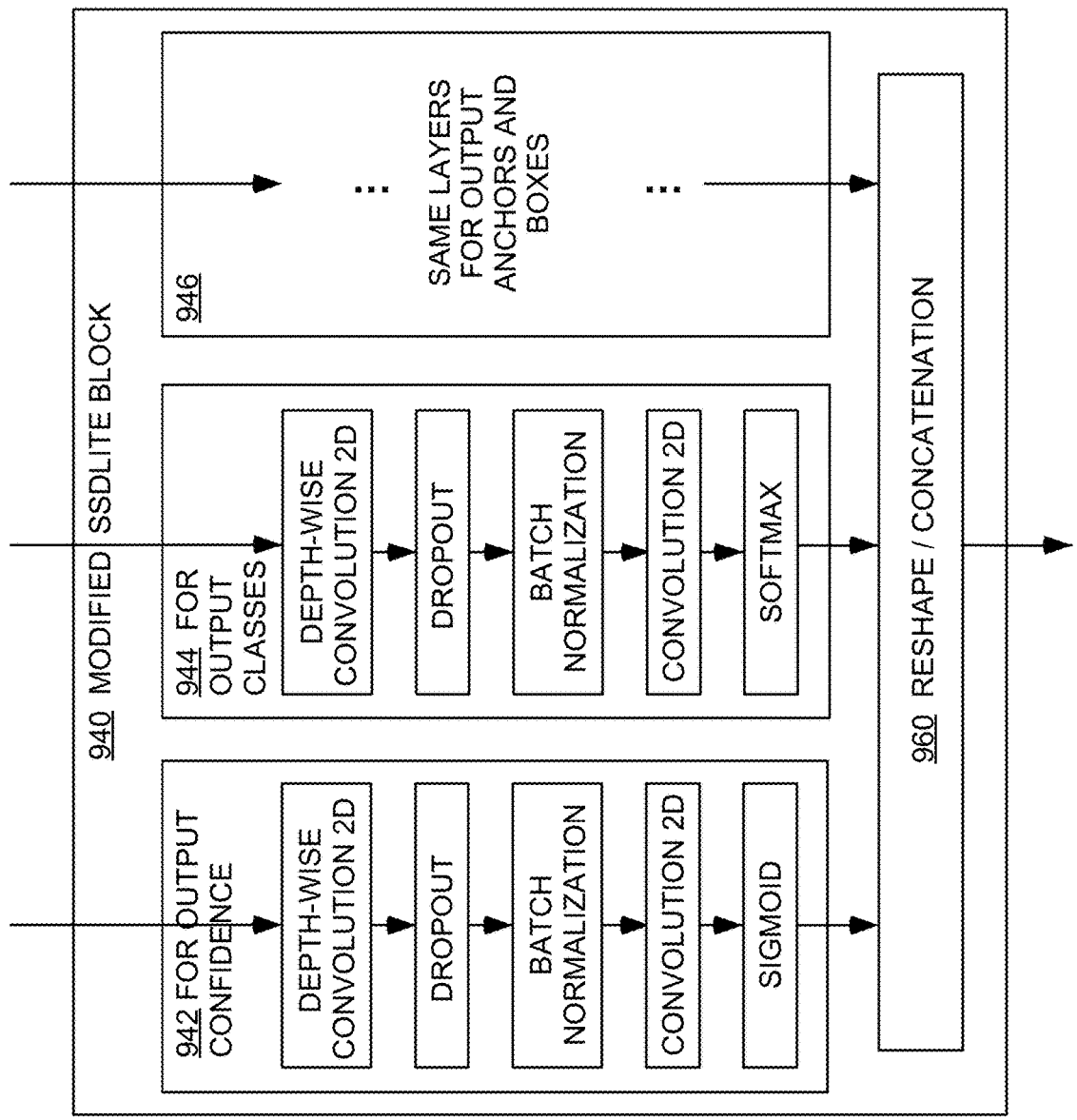
FIG. 9B is a detailed block diagram illustrating an exemplary Modified SSDLite Block, according to one embodiment of the present invention.

FIGS. 9A and 9B are respective block diagrams of an exemplary neural network for ball detection, according to one embodiment of the present invention. This object detector is presented for illustrative purposes only, and some embodiments of the present invention may utilize other computer vision system designs for object detection.

FIG. 9A is a block diagram 900 of an exemplary neural network for ball detection, according to some embodiments of the present invention. In particular, FIG. 9A shows a CNN-based ball detector utilizing an optimized, modified MobileNetV2 framework as a feature extractor and a modified SSDLite framework for multi-scale object detection. An input image 910 is first processed through a Modified MobileNetV2 block 920, the output of which is processed through a Modified SSDLite module 930 comprising two Modified SSDLite blocks 932 and 934, to generate output 936. The input, output, and kernel sizes shown in FIGS. 9A and 9B are for illustrative purposes only, and other similar hyperparameter values may be used in various embodiments of the present invention.

MobileNetV2 is an efficient convolutional neural network design for resource-constrained, mobile device-based computer vision applications. A first key building block of MobileNetV2 is depth-wise separable convolutions, which factorize a conventional, full convolutional operation into a first depth-wise convolution to filter the input channels, and a second point-wise convolution to combine outputs of the depth-wise network layer to build a feature map. Depth-wise separable convolutions trade significant improvements in computational efficiency for a small reduction in accuracy. A second key building block of MobileNetV2 is inverted residuals connecting linear bottleneck layers between individual depth-wise separable convolutional layers, which also tradeoff computation and accuracy. Linear bottleneck layers reduce the dimensionality of the input, while inverted residuals use shortcut connections between the bottlenecks to enable faster training and better accuracy.

Although not shown explicitly in FIG. 9A, in this exemplary embodiment, two MobileNetV2 output layers and 14 bottleneck operators may be used, a non-obvious reduction from the conventional setup with 6 MobileNetV2 output layers and 17 bottleneck operators. Such modifications optimize the feature extraction process to not only reduce the overall computational complexity but also improve the achievable accuracy by tailoring to the specific small input and ball detection goal.

FIG. 9B is a detailed block diagram illustrating an exemplary Modified SSDLite Block, such as 932 or 934 in FIG. 9A, according to some embodiments of the present invention. SSD refers to a Single Shot MultiBox Detector, a multi-object detection framework using a single deep neural network to discretize feature maps into multi-scale bounding boxes. SSD eliminates separate bounding box proposal generation and feature resampling stages to improve computation efficiency without compromising detection accuracy. SSDLite is a mobile-customized variant that utilizes depth-wise separable convolution in SSD prediction layers. Modified SSDLite block 940 shown in the exemplary embodiment of FIG. 9B further tailors and improves the accuracy of SSDLite by adding dropout layers.

More specifically, in Modified SSDLite Block 940, parallel network blocks 942, 944, and 946 are utilized to process the input data separately for output confidence, output classes, and output anchors and bounding boxes. Each block has the same architecture, comprising a depth-wise convolution in 2D space, dropout, batch normalization, further convolution, and a functional operation for classification. Feature maps thus generated are reshaped and/or concatenated via processing block 960 to generate output data.

For the ball detection task, two positive object classes may be considered: "ball" and "ball-in-hand." With conventional SSD or SSDLite framework, a single softmax function may be used to activate among background (e.g., no positive), and these two classes. By comparison, Modified SSDLite Block 940 is designed so that it may classify a ball out of a background, but does not always classify between ball and ball-in-hand for some training data. Such a design takes into account several factors. First, ball and ball-in-hand are not always distinguishable, even for a human. In addition to motion blur, background and other objects such as leg, arm, other people in the background could look like a hand in terms of shape and/or color. Second, having a classifier distinguish between ball and ball-in-hand may not always be worthwhile and may even compromise detection accuracy since there are "gray areas" where an input may be classified either way. Instead, within Modified SSDLite Block 940, a sigmoid function is used to produce confidence levels of whether a ball is present against a background, while a softmax function is used to classify between ball and ball-in-hand, or two output classes instead of three output classes for conventional SSD/SSDLite frames. As a further reduction to computational complexity, loss function and/or back propagation may be disabled if a given training case is in the "gray area."

Multiplayer Ball Game Tracking and Shooter Identification Based on Player Features Example operations described herein and in particular, the example operations described above in connection with FIGS. 1A to 9B may be performed by an NEX system application running on a mobile electronic device, such as shown and described in connection with FIG. 2 above.

Figure 10:
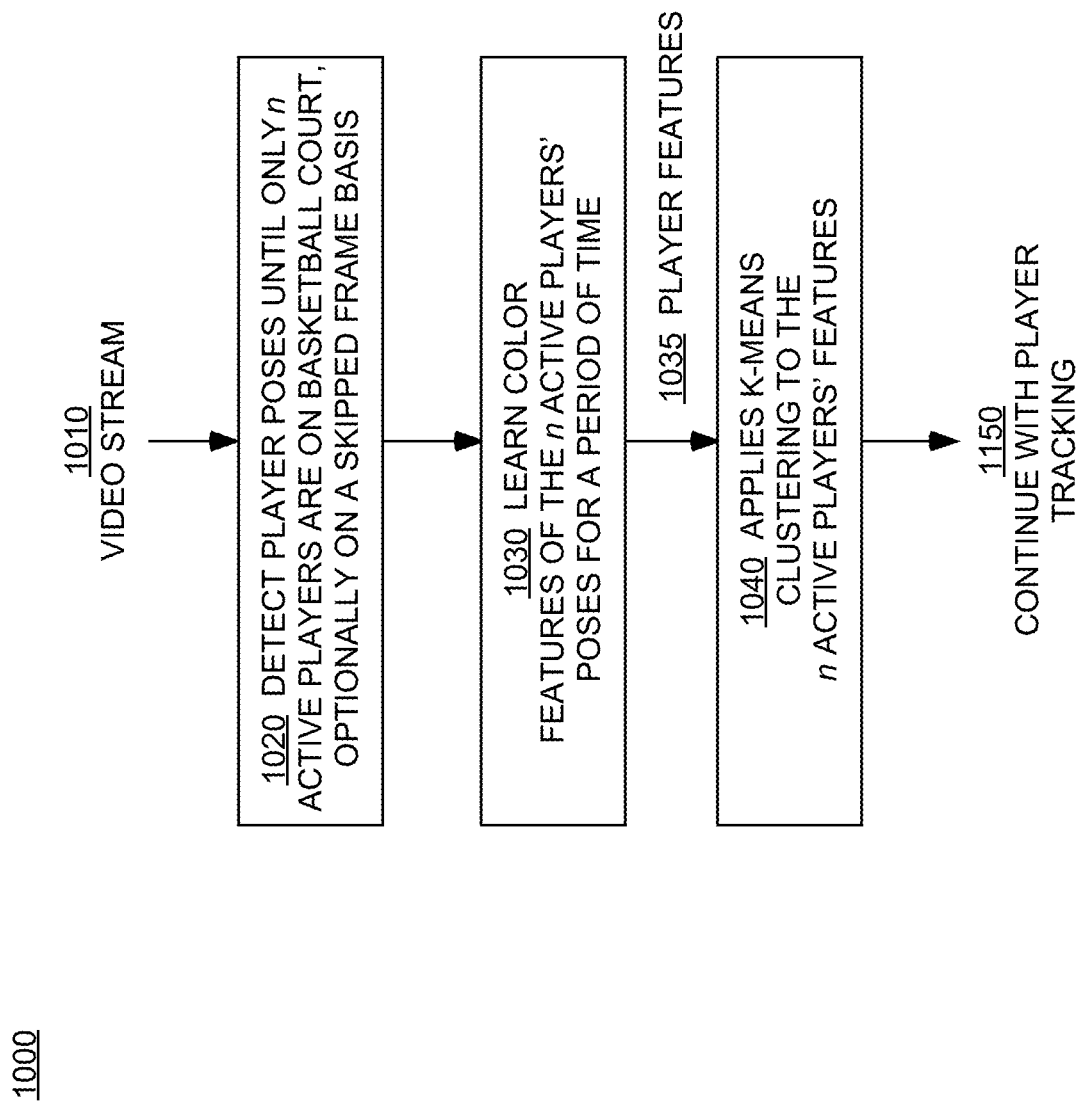
FIG. 10 shows a flowchart illustrating exemplary operations of a mobile computing device and associated algorithms for extracting and grouping multiple players' visual features, according to some embodiments of present invention.

FIG. 10 shows a flowchart 1000 illustrating exemplary operations of a mobile computing device and associated algorithms for setting up the tracking process of a multiplayer ball game, according to some embodiments of present invention. In some embodiments, the setup process may include a camera calibration step, or may be performed after a camera calibration step to adjust for levelness, distance from the players, brightness under a current lighting condition, and other similar environmental parameters. Camera calibration may refer to a process of estimating parameters of a camera model approximating the camera that produced a given game image or video. In some embodiments, the determined camera parameters may be represented in a matrix-form (e.g., a camera matrix). In some embodiments, a project model or a camera projection may also be computed after camera calibration, based on one or more feature points detected using one or more neural networks.

Furthermore, the setup process may include the steps of prompting, by the device, n players to position themselves in a gaming area such as a basketball court, and then running one or more artificial intelligence (AI)-based algorithms such as computer vision algorithms to detect the players. n maybe any integer greater than or equal to two. The detection of the players may take some time, such as milliseconds or seconds, to allow for the players to situate themselves in the gaming area, for the device to initialize and run the AI algorithms, and for sufficient data to be collected. In some embodiments, this set up time may be determined using a timer that is pre-set to an initial value by the players or other users. After detecting the players, the device may start the game tracking session automatically, or prompt the players to start the game tracking session.

In particular, at step 1020, a selected number of frames, or a portion of input video stream 1010 may be analyzed to detect player poses, optionally on a skipped frame basis (e.g., performed on every other frame, or every integer number of frames, such as, every second frame, every third frame, etc.) until only a pre-determined number of players (e.g., n players, n≥2) is in the gaming area (e.g., basketball court). In some embodiments, the frequency for performing the pose-estimation may be based at least in part on the device's computational resources, including processing power, memory, and the like. In some embodiments, step 1020 may further comprises a process to determine player locations in the gaming environment, for example, to determine that then players are in a basketball court by applying a camera projection to the players' foot locations in the image plane of the input game video stream, and checking against court lines.

At a setup step 1030, AI-based machine learning techniques may be applied to determine and learn the color features 1035 of the players' poses for a predetermined duration or period of time (e.g., a few milliseconds to a few seconds). In some embodiments, other visual features besides color, such as texture, and shape may be used in addition to the color features. As noted, the NEX system may determine color features, or other complex visual features, from the players' poses by analyzing image pixels around specific regions or locations, such as along the torso, hips, thighs, or on interpolated points in-between key points, such as along the limbs. Such color features may be extracted from clothing and/or a portion of the body (e.g., a leg region) of the players, based at least in part on the detected poses. Further, the extracted color features may be mathematically represented as a vector quantity.

At step 1040, a machine learning clustering algorithm such as a k-means clustering algorithm may be applied to classify player features 1035 into at least n clusters, each presenting a separate player or a "non-player." Clustering generally refers to the task of grouping a set of objects in such a way that objects in the same group (called a cluster) are more similar to each other than to those in other groups (dusters). In addition, clusters may include groups with small distances (e.g., Euclidian distance or some other type of mathematically determined distance) between cluster members, dense areas of the data space, intervals, or particular statistical distributions.

As noted, the AI-based algorithm may use a k-means clustering to the extracted player visual features. In some embodiments, the clustering algorithm and/or any associated parameter settings (including parameters such as the distance function to use, a density threshold or the number of expected clusters, and the like) may be based at least in part on the data and intended use of the results. In particular, in an assignment step of the k-means clustering algorithm, each observation corresponding to a given frame may be assigned to the duster whose mean has the least squared distance (e.g., Euclidean distance). In an update step, the new means may be calculated to be the centroids of the observations in the new clusters. The algorithm may be considered to have converged when the assignments no longer change. In some embodiments, the feature centroids determined via a clustering algorithm and corresponding to visual centers of the players may serve as profile or reference player features to be used in subsequent recording and game tracking steps as described below. The process continues at step 1150 with player tracking.

Figure 11:
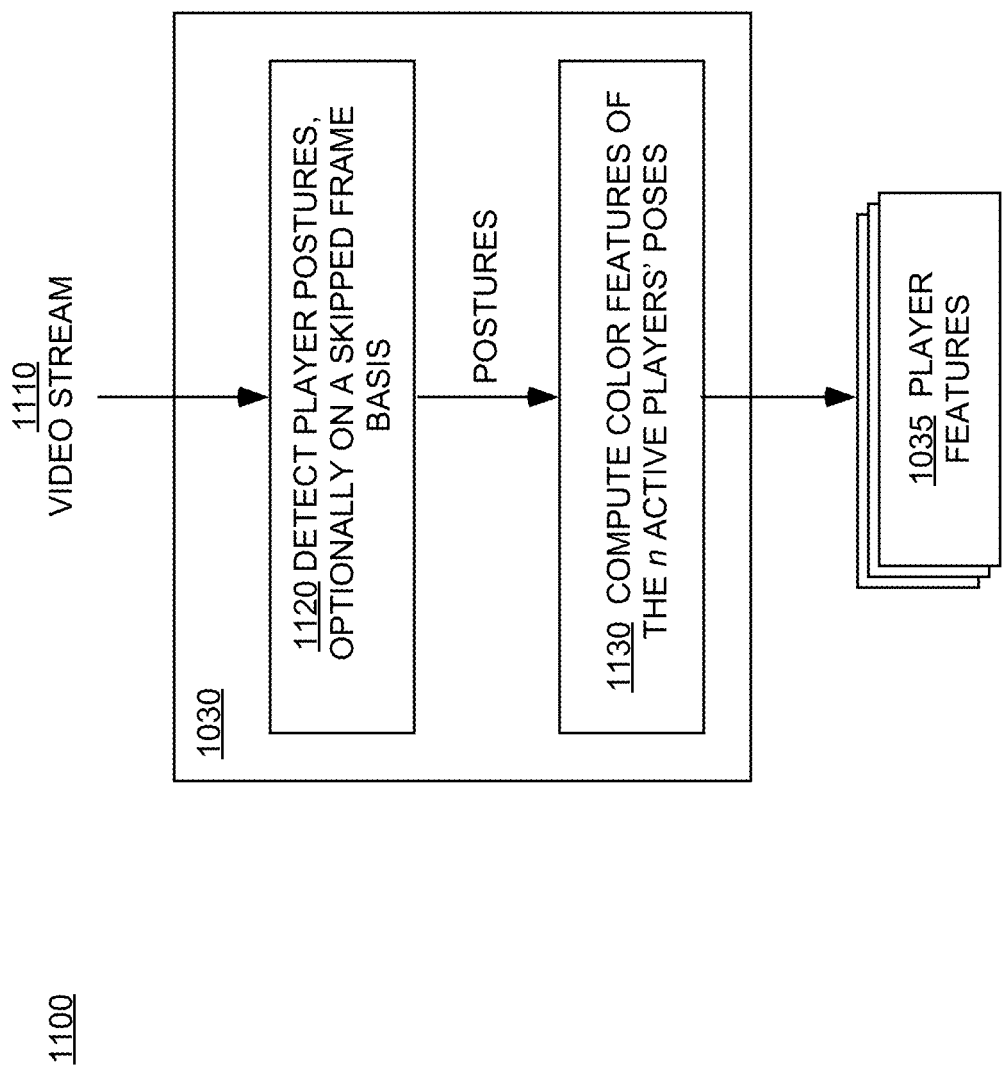
FIG. 11 shows a flowchart illustrating exemplary operations of a mobile computing device an associated algorithms to extract player features for tracking a multiplayer ball game, according to some embodiments of the present invention.

FIG. 11 shows a flowchart 1100 illustrating exemplary operations for step 1030 shown in FIG. 10, according to some embodiments of the present invention. At step 1120, player poses or postures may be detected from input video stream 1110, optionally on a skipped frame basis. At step 1130, color features 1035 of the n players' poses may be computed.

Figure 12:
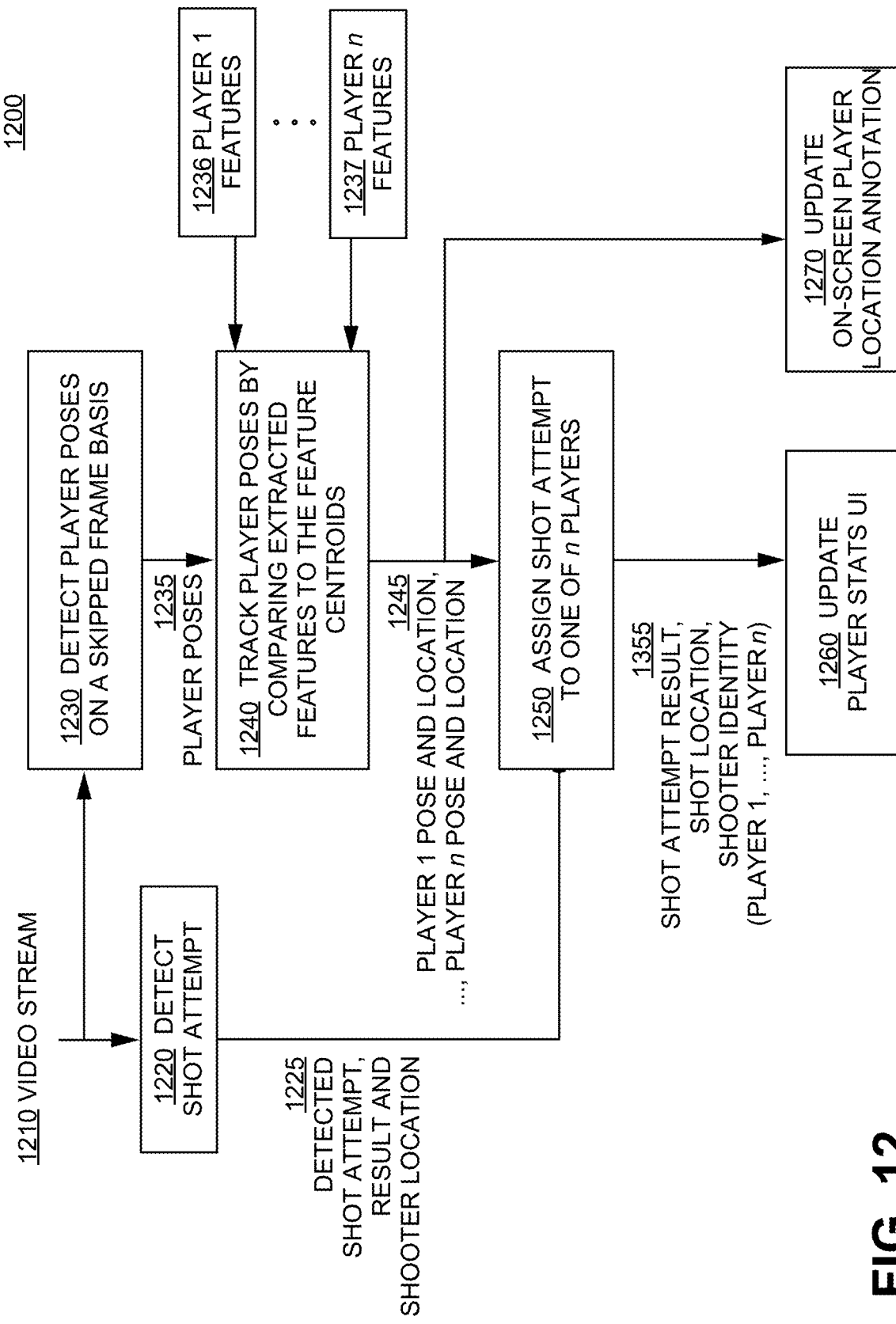
FIG. 12 shows a flowchart illustrating exemplary operations of a mobile computing device and associated algorithms for determining a shooter and other characteristics of a shot attempt in a multiplayer ball game, according to some embodiments of present invention.

FIG. 12 shows a flowchart 1200 illustrating exemplary operations of a mobile computing device and associated algorithms for game tracking, including determining a shooter and other characteristics of a shot attempt in a multiplayer ball game, according to some embodiments of present invention. The overall player tracking process illustrated in FIG. 12 may be executed after step 1040 in FIG. 10. In some embodiments, game recording and tracking may be performed on a continuous basis as additional streaming data become available. Game tracking may take advantage of the structure and rules of game being played (e.g., the rules and framework of, for example, a one-on-one basketball game). For example, a one-to-one basketball game is played between two players and the NEX system may use such game information in feature clustering as discussed above and in more detail below. In some embodiments, an explicit user input may provide game information such as number of players, and team organization. In some embodiments, the NEX system may guess with high confidence at the number of players and/or team organization based object detection results, such as whether players wear common but non-identical colors, and whether players stand in groups during the setup process.

At step 1220, shot attempt detection may be performed by the device and associated algorithms, for example as described in parent patent application U.S. Ser. No. 16/109,923, entitled "Methods and Systems Ball Game Analytics with a Mobile Device," the entire disclosure of which is hereby incorporated by reference in its entirety herein.

At step 1230, player poses 1235 may be detected based on a skipped frame basis, and its visual features computed for player tracking in step 1240. Profile or reference player features 1236 to 1237 as computed in step 1040 may be used as input to step 1240, where newly extracted player poses may be tracked by comparing corresponding visual features to the profile player feature centroids computed from profile player feature clusters 1236 to 1237. Moreover, as more player visual features become available and are classified, profile player feature clusters 1236 to 1237 may be continuously updated and refined.

More specifically, the NEX system may first extract a player visual feature from each detected player pose, as described above. Each extracted player visual feature is then compared to profile player features 1236 to 1237 or feature centroids computed for each feature clusters, as described above. A bipartite matching may be applied to assign the detected player visual features to the n profile player visual feature clusters, and corresponding player poses to respective players.

In some embodiments, foot location associated with each pose of a player may be used to compute the location of the player within the gaming area. For example, a camera projection may be applied to the foot image coordinates while assuming that the feet of the player are on the ground.

In some embodiments, one player (e.g., a representative Player 1) may be occluded by another (un-occluded) player (e.g., a second Player 2). Accordingly, the NEX system may use processed information from the other, un-occluded Player 2 in determining Player 1's location. In particular, the NEX system may adjust the location of the other, un-occluded Player 2 to be farther along a depth direction associated with a camera used to image the players and the gaming environment, and assign the adjusted location as the occluded Player 1's location.

As noted, player poses may be tracked continuously by comparing a given feature determined from a particular frame to the feature centroids. In some embodiments, if a given Player 1 is making certain movements, for example, jumping, one or more feet of Player 1 may not be on the floor, so the location of the one or more feet may need to be determined using an additional operation. For example, the location of the one or more feet may be determined by using a player location determined from an adjacent frame of the video stream.

In some embodiments, Player 1's movements, such as a jumping motion may be detected by comparing Player 1's projected height with the Player 1's projected height in other frames (e.g., adjacent frame) in the video stream. Moreover, the higher the projected height of the pose is calculated to be, the more likely (e.g., the higher probability) that Player 1's is jumping. Therefore, a given player's location (e.g., Player 1's location) may be determined from a weighted sum of at least the following: (a) an adjacent frame's player location (corresponding to Player 1's location in an adjacent frame), and (b) another player's location (e.g., a Player 2's location). Additionally, the other player's location (i.e., Player 2's location) may be assigned a higher weight if the given player (i.e., Player 1) is occluded. Moreover, in another embodiment, the current frame's player location may be assigned a lower weight if the player's projected height is different from average projected height of the player.

At step 1250, player poses and locations 1245 as well as shot attempt detection result 1225 may be combined to assign the shot attempt to one of the n players to determine a shooter identity, based at least in part on results of the previous steps. A shot attempt location or shot location refers to a position in the gaming area, such as, for example, a three-point line, a foul line, and the like, where the shot attempt has been initiated.

More specifically, after player poses are detected, the NEX system may assign a given attempt to a given player. For example, the device and associated algorithms may first perform shot attempt location detection, as disclosed in parent patent application U.S. Ser. No. 16/109,923. Next, by matching the detected shot attempt location to the players' detected locations, a location assignment may be performed accordingly. However, the occlusion of one or more of the players may lead to wrong detection output by the location detection performed via techniques described herein. In some embodiments, a heuristic technique may be applied by taking advantage of the mechanism of the game. For example, if the occlusion of a given player is frequently occurring during the shooting period (e.g., about two seconds) in a one-on-one basketball game, the device and associated algorithms may use the location of the player who is farther away from the basket.

At steps 1260 and 1270, game and player analytics and statistics may be updated, both in a player statistics user interface associated with the game, and any on-screen player location annotations.

Figure 13:
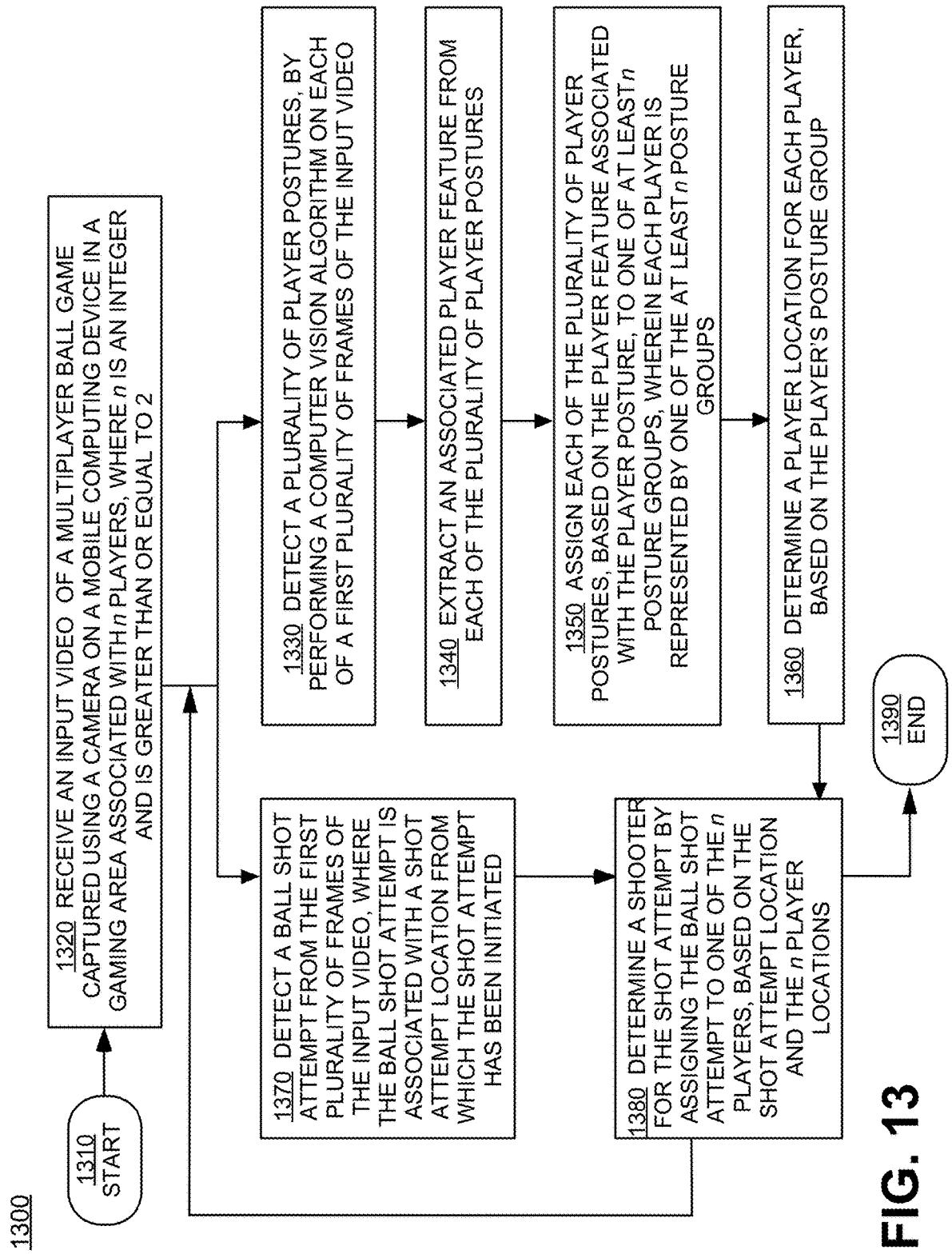
FIG. 13 shows a flowchart illustrating exemplary operations of a mobile computing device and associated algorithms for determining a shooter of a shot attempt in a multiplayer ball game, according to some embodiments of present invention.

FIG. 13 shows a flowchart 1300 illustrating exemplary operations of a mobile computing device and associated algorithms for tracking a multiplayer ball game and determining a shooter of a shot attempt in the multiplayer ball game, according to some embodiments of present invention. Upon initialization at step 1310, an input video of a multiplayer ball game may be received at step 1320, where the input video is captured using a camera on a mobile computing device in a gaming area associated with n players. At step 1330, a plurality of player postures may be detected, by performing a computer vision algorithm on each of a first plurality of frames of the input video. At step 1340, an associated player feature, such as a color visual feature, may be extracted from each of the plurality of player postures. At step 1350, each of the plurality of player postures may be assigned, based on the associated player feature, to one of at least n posture clusters, sets, or groups, where each player is represented by one of the at least n posture groups. At step 1360, a player location may be determined for each player, based on the player's posture group. At step 1370, a ball shot attempt is detected from the first plurality of frames of the input video, where the ball shot attempt is associated with a shot attempt location from which the shot has been initiated. At step 1380, a shooter for the shot attempt may be determined by assigning the ball shot attempt to one of the n players, based on the shot attempt location, and the n player locations. The process continues as the game progresses and more shot attempts are made, and may terminate at step 1390 once the game session is completed.

Figure 14A:
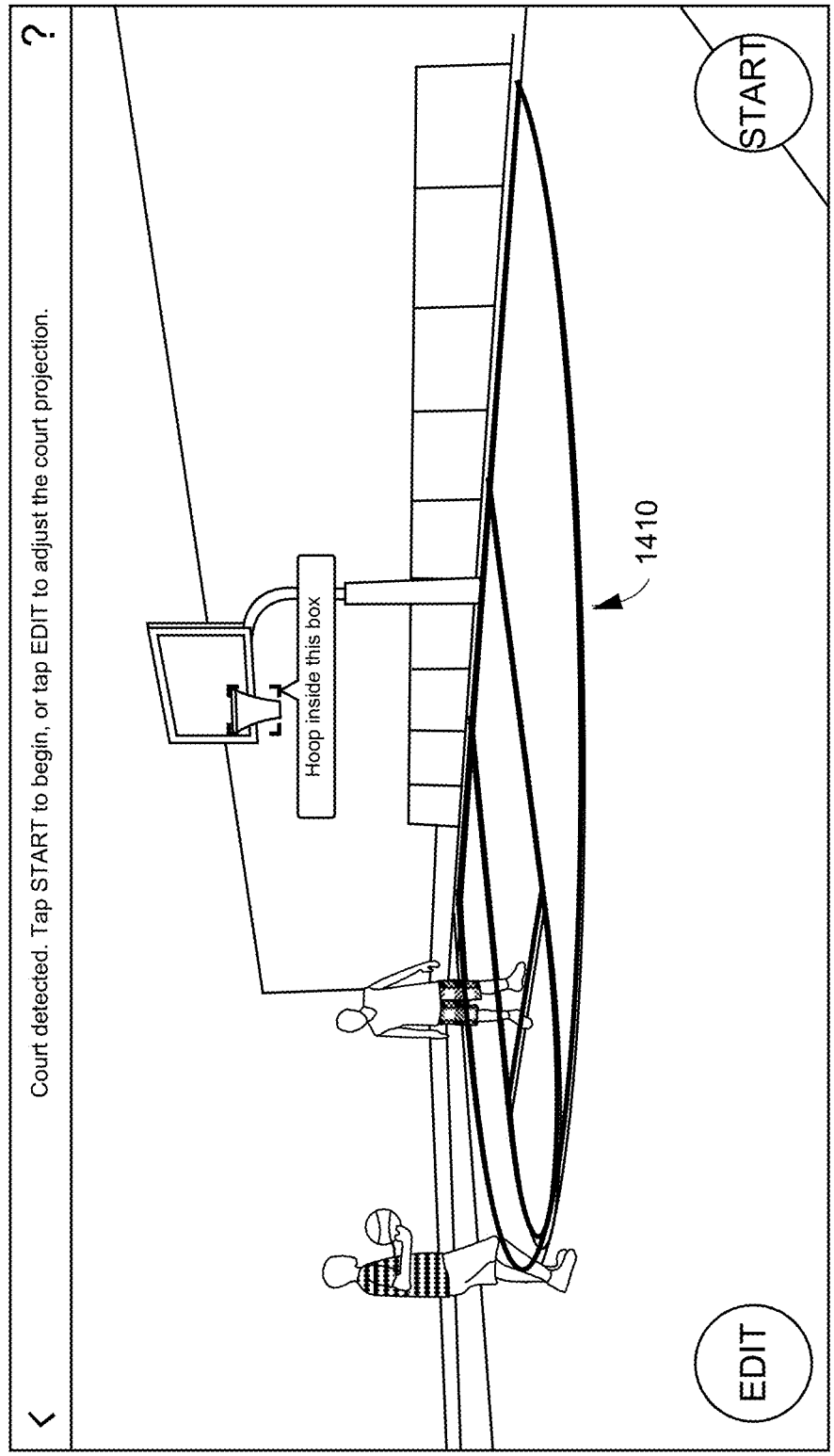
FIGS. 14A, 14B, and 14C show respective diagrams representing an exemplary application running on a mobile computing device to track a multiplayer ball game, according to some embodiments of the present invention.
Figure 14B:
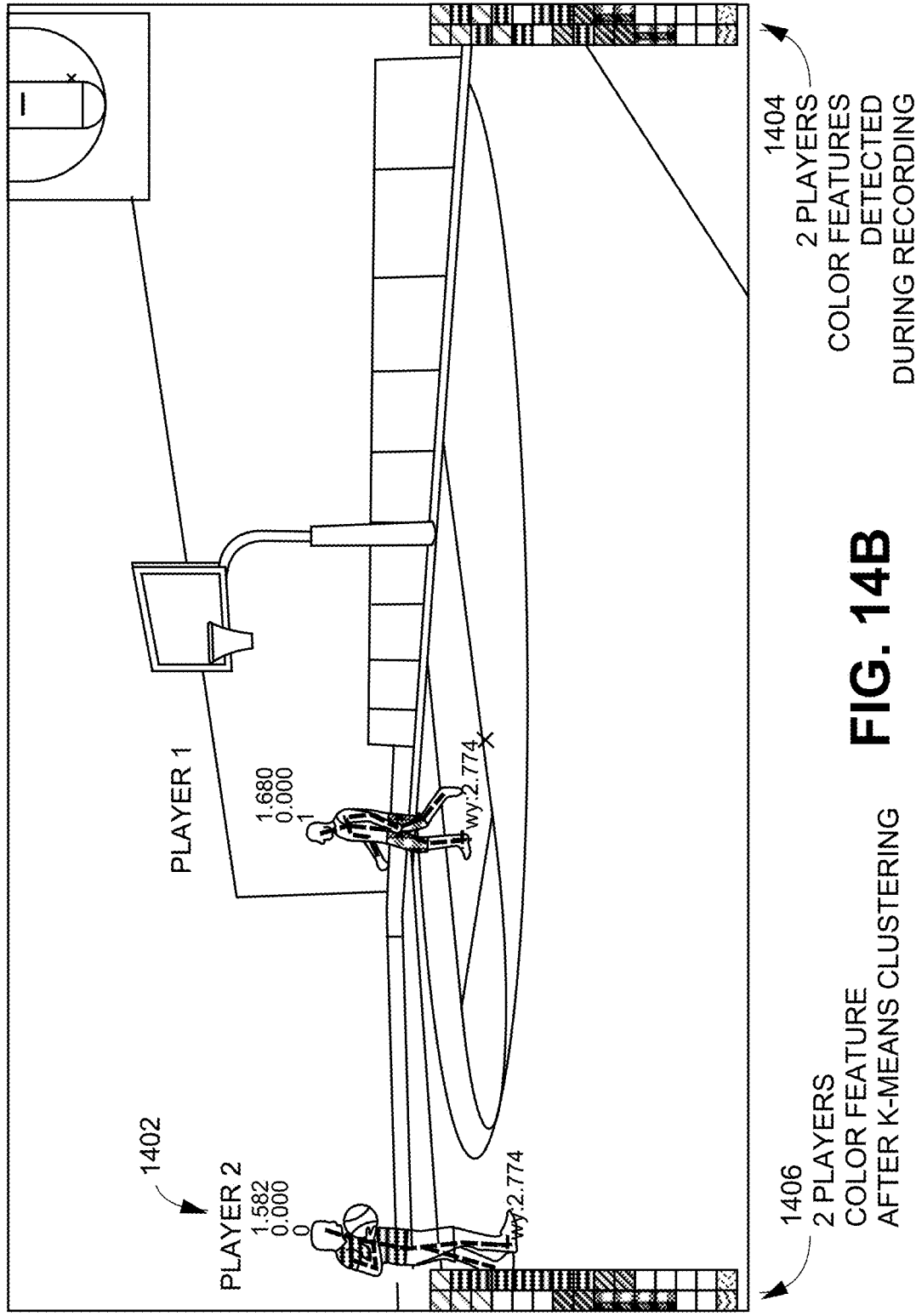
Figure 14C:
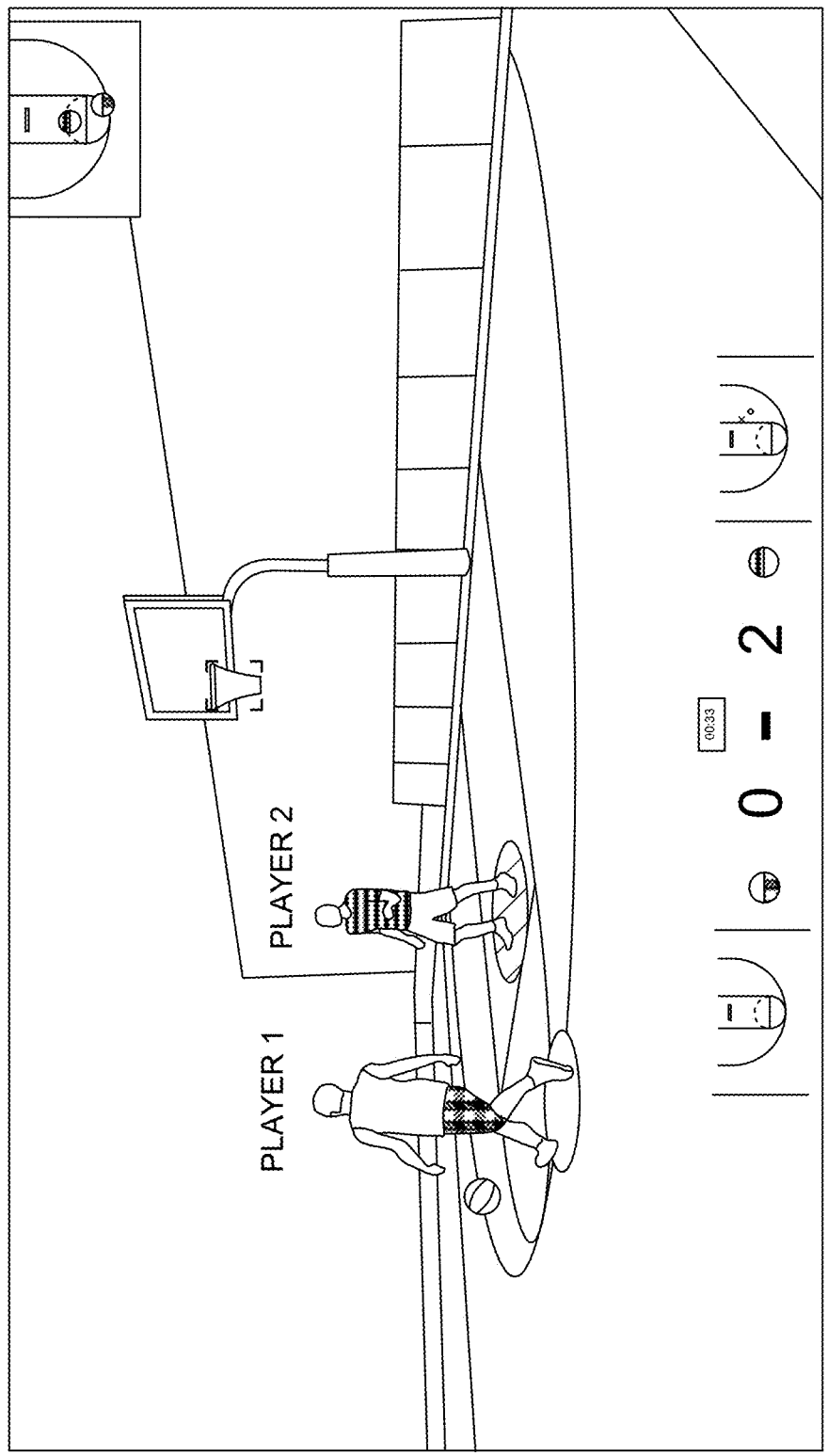

FIGS. 14A, 14B, and 14C show respective diagrams representing an exemplary application running on a mobile computing device to track a multiplayer ball game, according to some embodiments of the present invention.

FIG. 14A shows a court line detection result during the setup process, where the user has the option to start the game tracking session, or adjust the court line projections 1410 manually.

FIG. 14B is a screenshot 1430 illustrating results of player pose and color feature detections for a single frame in an input video. Two players are present in the ball court. A height 1402 of Player 2 may be detected and assigned a numerical value. Element 1404 shows the two players' color features detected from this video frame, in real-time. Further, element 1406 shows two players' color features after the application and convergence of k-means clustering, as described above.

FIG. 14B is identical to FIG. 1B and shows results for shooter identification, player position annotation and game analytic determination.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device, as illustrated in FIG. 2, is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A method for determining player locations in a multiplayer ball game, comprising:
   receiving one or more setup frames and one or more input frames of the multiplayer ball game captured using a camera on a mobile computing device in a gaming area associated with n players, wherein n is greater than or equal to 2;
   detecting a plurality of players by performing a computer vision algorithm on the setup frames;
   extracting a setup player visual feature from each of the plurality of players to generate a plurality of player visual features;
   classifying the plurality of player visual features into one of n player visual feature groups representing the n players respectively;
   detecting a plurality of player postures, by performing the computer vision algorithm on the one or more input frames of the multiplayer ball game associated with the n players;
   extracting an associated player visual feature from each of the plurality of player postures;
   assigning each of the plurality of player postures, based on the player visual feature associated with the player posture, to one of the n player visual feature groups, wherein each player is represented by one of the n player visual feature groups; and
   determining a player location for each player, based on the assigned player visual feature group of each player.

2. The method of claim 1, further comprising:
   detecting a ball shot attempt from the input frames, wherein the ball shot attempt is associated with a shot attempt location from which the shot attempt has been initiated; and
   determining a shooter for the shot attempt by assigning the ball shot attempt to one of the n players, based on the shot attempt location, and the n player locations.

3. The method of claim 2, further comprising:
   generating a player analytic for the shooter based on a result of the shot attempt.

4. The method of claim 1, wherein each of the plurality of player visual features is a color feature quantifying color characteristics of one or more regions of a player image.

5. The method of claim 1, wherein the input frames are non-contiguous.

6. The method of claim 1, wherein the input frames are from a live video stream.

7. The method of claim 1, further comprising an initialization step of:
   detecting a presence of the n players within a set of boundary lines in the gaming area.

8. The method of claim 7, wherein the detecting the presence of the n players within the set of boundary lines is by applying a camera projection to initial foot locations of the n players in an image plane of the input frames to determine locations of the players in the gaming area, wherein the initial foot locations are extracted from a second plurality of input frames.

9. The method of claim 1, wherein each player visual feature is extracted from the setup frames utilizing pose information of each player.

10. The method of claim 1, wherein the classifying of the plurality of player visual features comprises applying a k-means clustering algorithm to the plurality of player visual features.

11. The method of claim 1, further comprising computing n player visual feature centroids for the n player visual feature groups, and wherein the assigning each of the plurality of player postures to one of the n player visual feature groups is by bipartite matching to assign each of the plurality of player postures to a player having a player visual feature centroid closer to the player visual feature associated with the player posture.

12. The method of claim 1, further comprising:
   for each player, determining a player foot location in an image plane of the input frames, based on the corresponding player visual feature group, wherein each player location is a location in the gaming area, and wherein the determining of each player location is by applying a camera projection to the corresponding player foot location.

13. The method of claim 12, further comprising:
   determining whether a first player is occluded by a second player; and
   in response to determining that the first player is occluded, adjusting the first player location along a camera depth direction associated with the mobile computing device.

14. The method of claim 1, further comprising:
   receiving a user input indicating that n players are participating in the multiplayer ball game.

15. The method of claim 1, wherein the computer vision algorithm comprises a convolutional neural network (CNN) module.

16. The method of claim 1, wherein the ball game is basketball.

17. A system for determining player locations in a multiplayer ball game, comprising:
   at least one processor; and
   a non-transitory computer-readable storage medium for storing program code accessible by the at least one processor, the program code when executed by the processor causes the processor to:
      receive one or more setup frames and one or more input frames of the multiplayer ball game captured using a camera on a mobile computing device in a gaming area associated with n players, wherein it is greater than or equal to 2;
      detect a plurality of players by performing a computer vision algorithm on the setup frames;
      extract a setup player visual feature from each of the plurality of players to generate a plurality of player visual features;
      classify the plurality of player visual features into one of n player visual feature groups representing the n players respectively;
      detect a plurality of player postures, by performing the computer vision algorithm on the one or more input frames of the multiplayer ball game associated with the n players;
      extract an associated player visual feature from each of the plurality of player postures;
      assign each of the plurality of player postures, based on the player visual feature associated with the player posture, to one of the n player visual feature groups, wherein each player is represented by one of the n player visual feature groups; and determine a player location for each player, based on the assigned player visual feature group of each player.

18. The system of claim 17, wherein the program code when executed by the processor further causes the processor to:
- detect a ball shot attempt from the input frames, wherein the ball shot attempt is associated with a shot attempt location from which the shot attempt has been initiated; and
- determine a shooter for the shot attempt by assigning the ball shot attempt to one of the n players, based on the shot attempt location, and the n player locations.

19. A non-transitory computer-readable storage medium for determining player locations in a multiplayer ball game, the non-transitory computer-readable storage medium comprising program code stored thereon, and the program code when executed by a processor causes the processor to:
- receive one or more setup frames and one or more input frames of the multiplayer ball game captured using a camera on a mobile computing device in a gaming area associated with n players, wherein n is greater than or equal to 2;
- detect a plurality of players by performing a computer vision algorithm on the setup frames;
- extract a setup player visual feature from each of the plurality of players to generate a plurality of player visual features;
- classify the plurality of player visual features into one of n player visual feature groups representing the n players respectively;
- detect a plurality of player postures, by performing the computer vision algorithm on the one or more input frames of the multiplayer ball game associated with the n players;
- extract an associated player visual feature from each of the plurality of player postures;
- assign each of the plurality of player postures, based on the player visual feature associated with the player posture, to one of the n player visual feature groups, wherein each player is represented by one of the n player visual feature groups; and
- determine a player location for each player, based on the assigned player visual feature group a each player.

20. The non-transitory computer-readable storage physical medium of claim 19, wherein the program code when executed by the processor further causes the processor to:
- detect a ball shot attempt from the input frames, wherein the ball shot attempt is associated with a shot attempt location from which the shot attempt has been initiated; and
- determine a shooter for the shot attempt by assigning the ball shot attempt to one of the n players, based on the shot attempt location, and the n player locations.

* * * * *